US008755346B2

(12) United States Patent
Ohta et al.

(10) Patent No.: US 8,755,346 B2
(45) Date of Patent: Jun. 17, 2014

(54) BASE STATION, RADIO RESOURCE ALLOCATION METHOD, AND RECORDING MEDIUM

(75) Inventors: Daisuke Ohta, Tokyo (JP); Takahiro Nobukiyo, Tokyo (JP); Naoto Ishii, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 143 days.

(21) Appl. No.: 13/412,278

(22) Filed: Mar. 5, 2012

(65) Prior Publication Data

US 2012/0224545 A1 Sep. 6, 2012

(30) Foreign Application Priority Data

Mar. 4, 2011 (JP) .................................. 2011-047395

(51) Int. Cl.
*H04W 72/04* (2009.01)
(52) U.S. Cl.
USPC .......................................................... 370/329
(58) Field of Classification Search
USPC .................... 370/254–350; 709/201–213
See application file for complete search history.

(56) References Cited

U.S. PATENT DOCUMENTS

| 2006/0269005 A1* | 11/2006 | Laroia et al. ................. 375/260 |
| 2008/0084844 A1* | 4/2008 | Reznik et al. ................ 370/330 |
| 2010/0254292 A1* | 10/2010 | Kim et al. .................... 370/311 |

FOREIGN PATENT DOCUMENTS

WO WO 2011000154 A1 * 1/2011

OTHER PUBLICATIONS

3GPP TS 36.213 V8.8.0, Sep. 2009, pp. 25-33 and 47-48.
Bin Fan, et al., "A Dynamic Resource Allocation Scheme Based on Soft Frequency Reuse for OFDMA Systems", IEEE 2007 International Symposium on Microwave, Antenna, Propagation, and EMC Technologies for Wireless Communications, Aug. 2007, pp. 121-125.

* cited by examiner

*Primary Examiner* — Ayaz Sheikh
*Assistant Examiner* — Debebe Asefa
(74) *Attorney, Agent, or Firm* — Sughrue Mion, PLLC

(57) ABSTRACT

For a communication terminal performing radio communication, a base station acquires communication path quality information representing a communication path quality, which is the quality of a communication path with the communication terminal. The base station allocates power larger than reference transmission power as transmission power to an edge terminal configuring at least part of an edge terminal group configured by an edge terminal that is a communication terminal whose communication path quality is lower than a threshold quality, allocates the reference transmission power as the transmission power to an edge terminal configuring a remaining part of the edge terminal group.

19 Claims, 11 Drawing Sheets

BACKGROUND ART

BACKGROUND ART

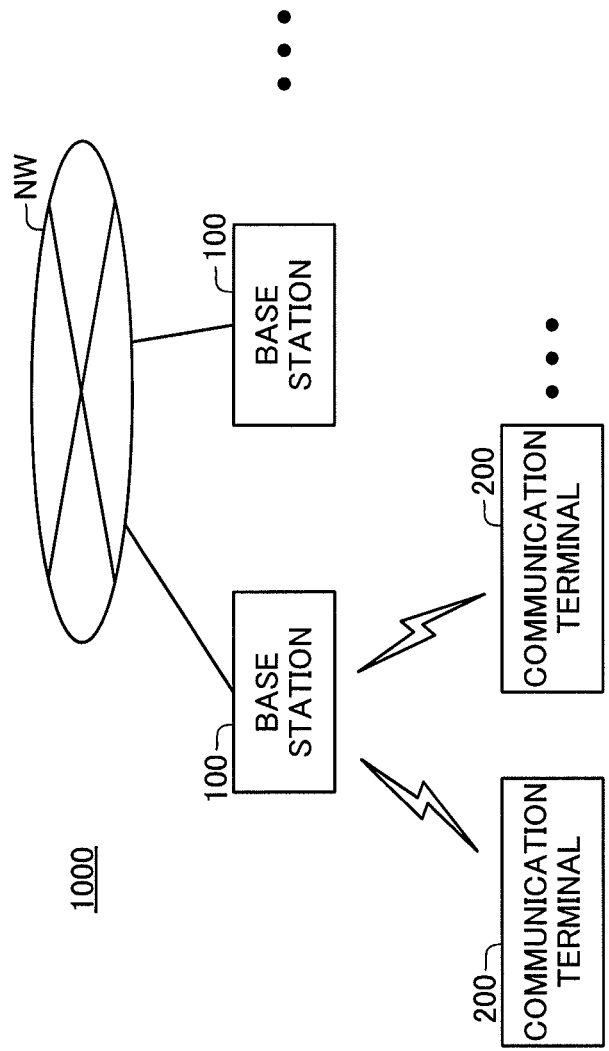

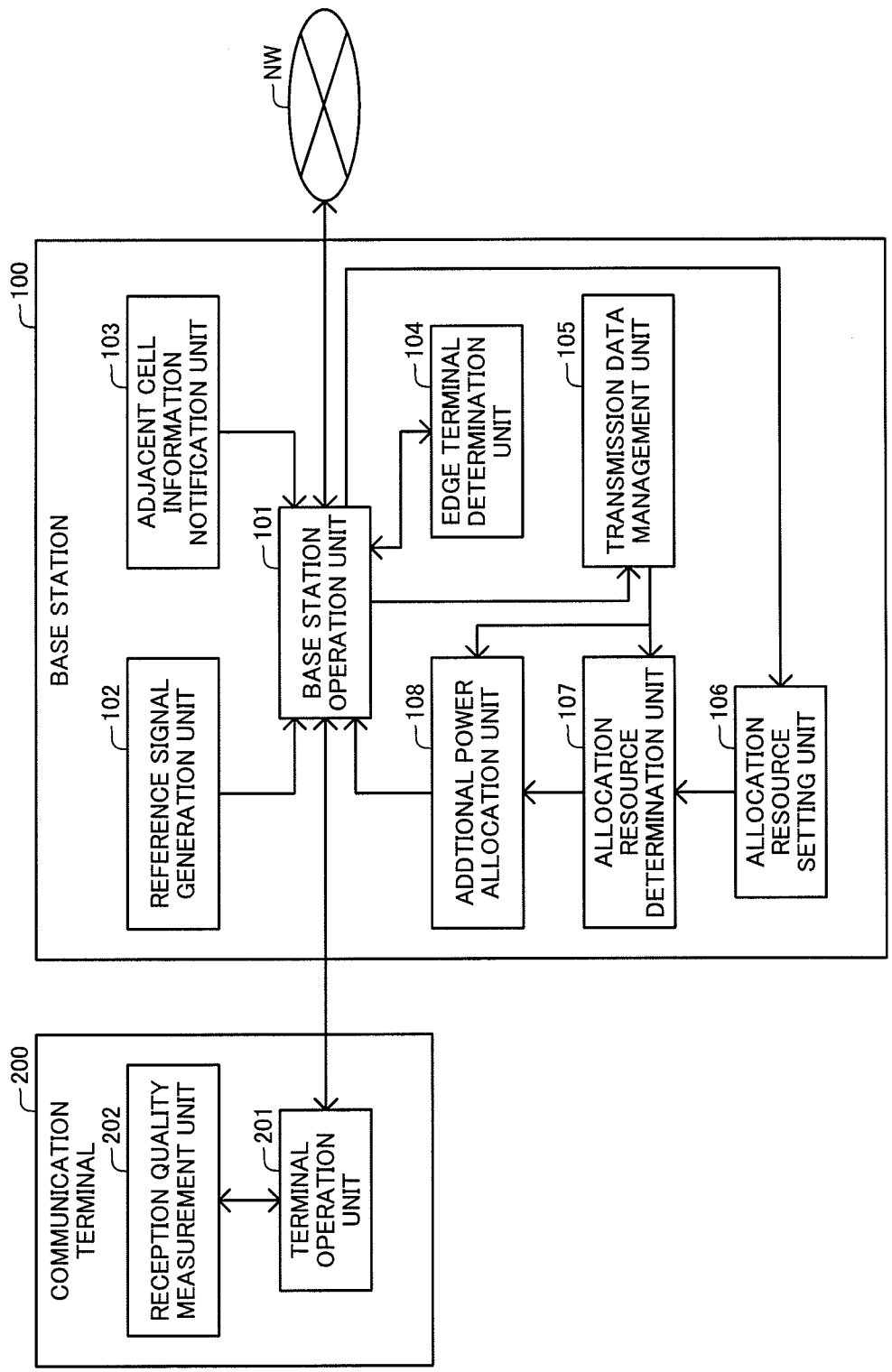

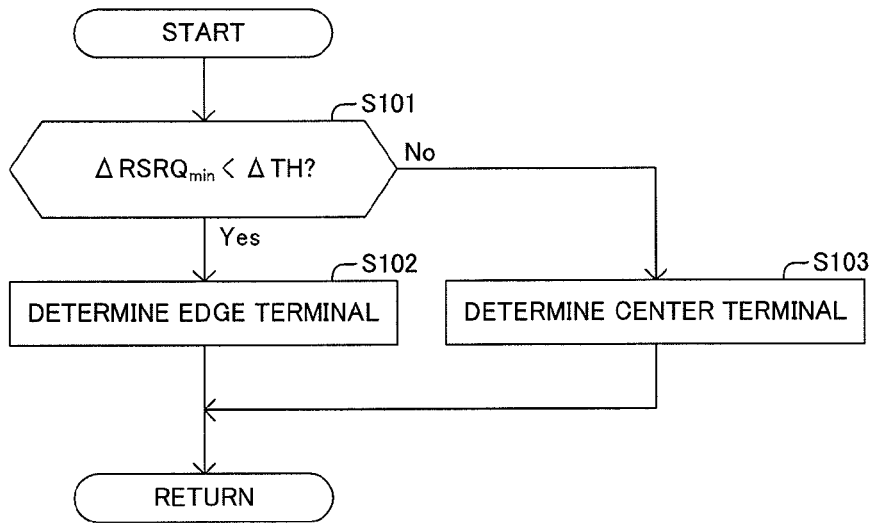
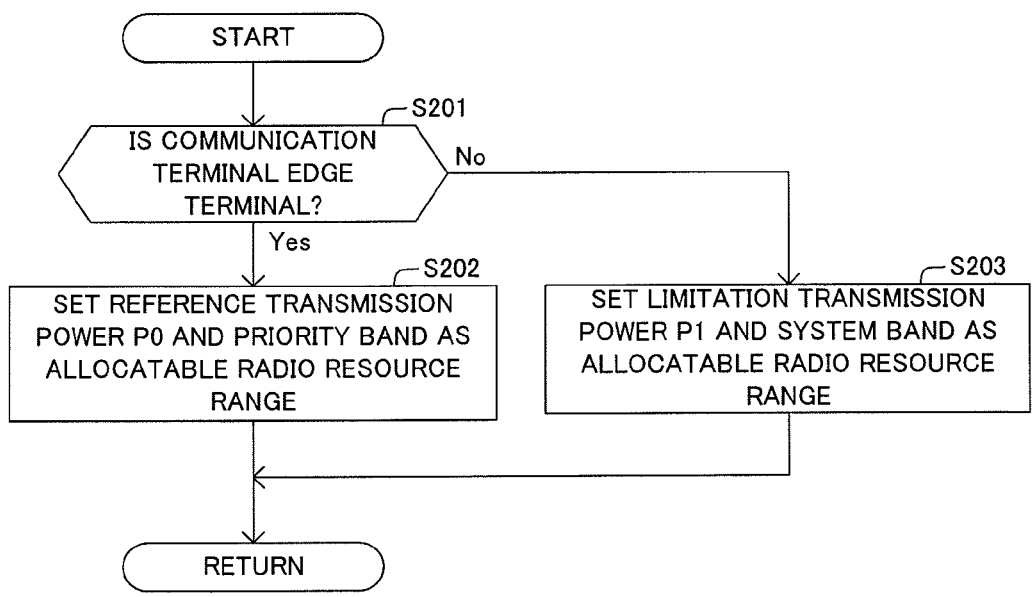

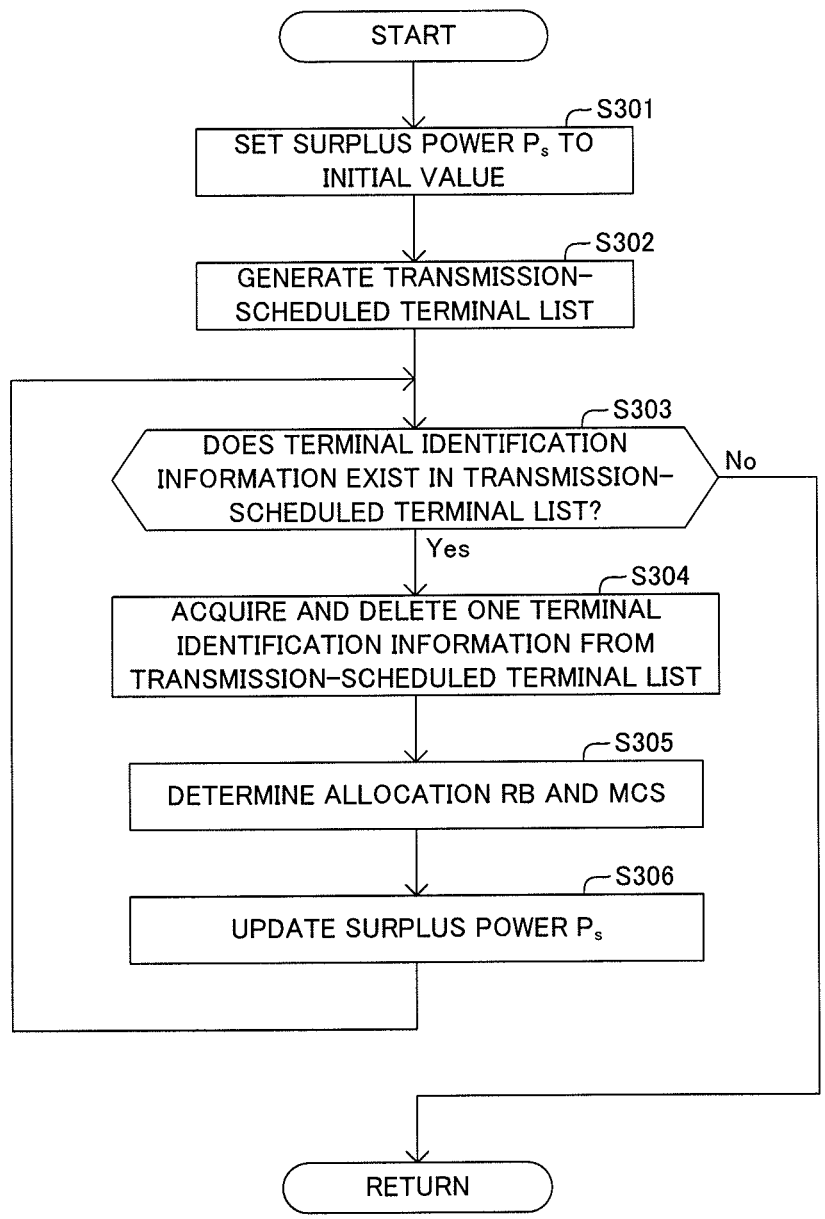

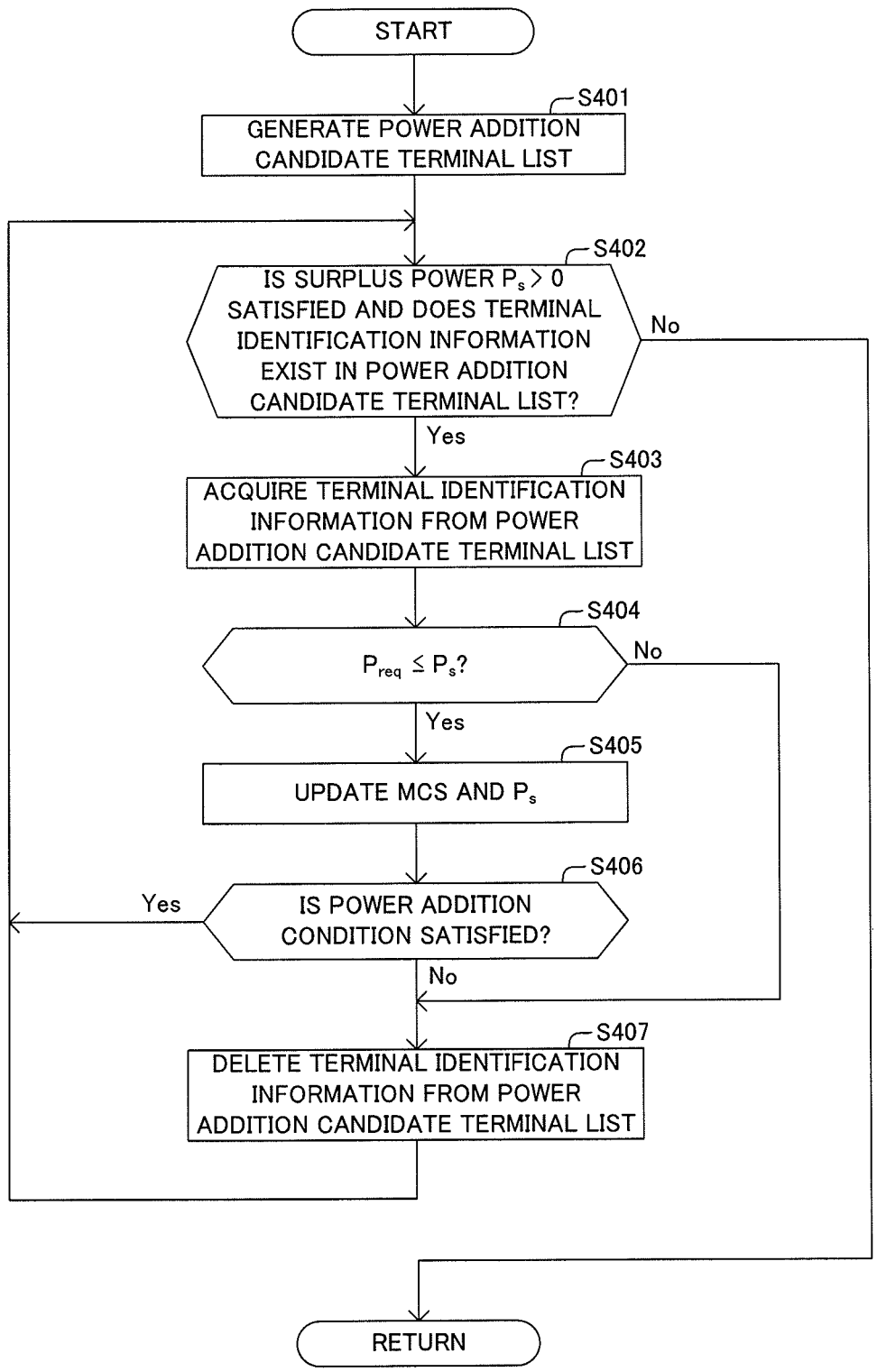

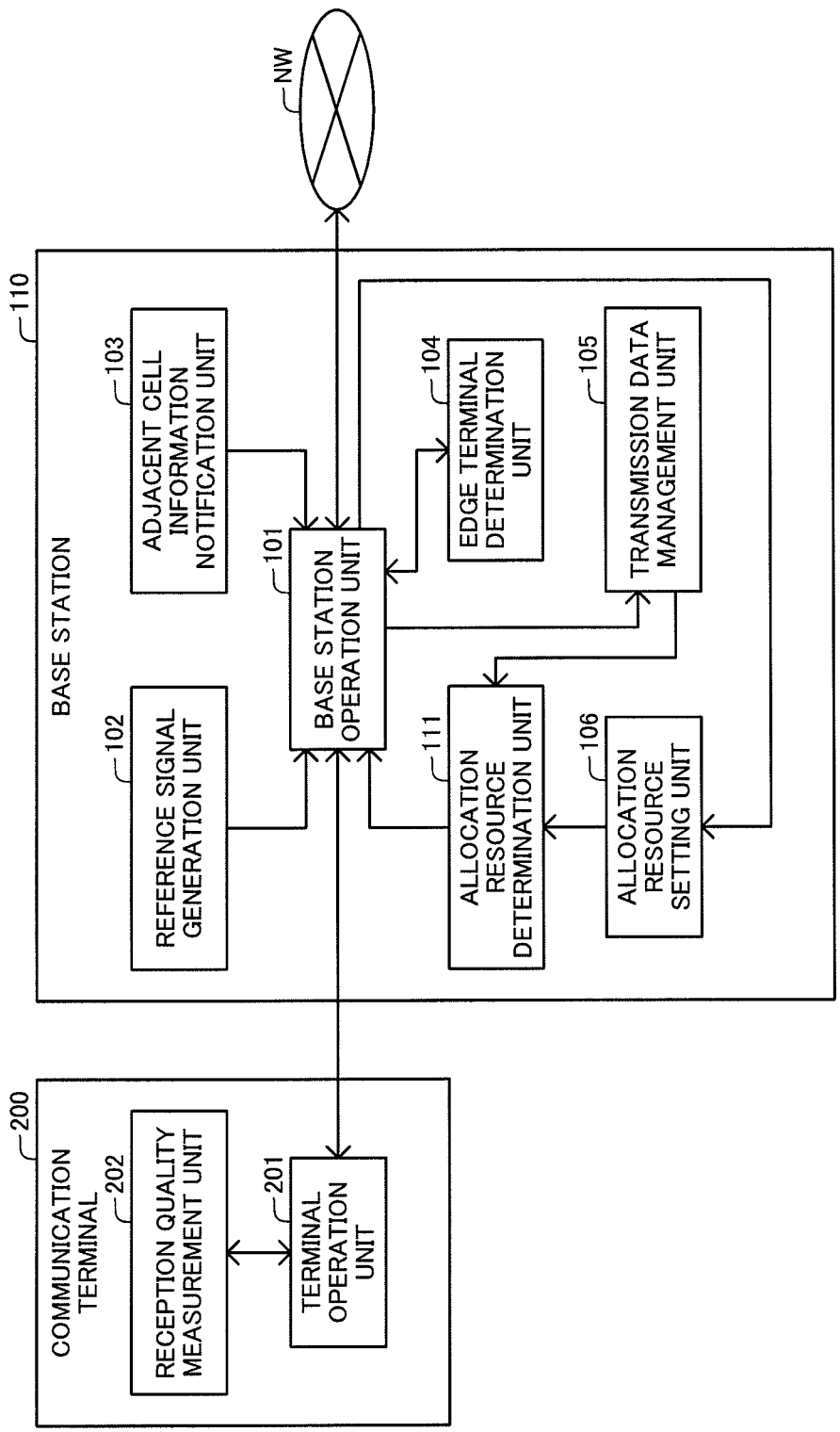

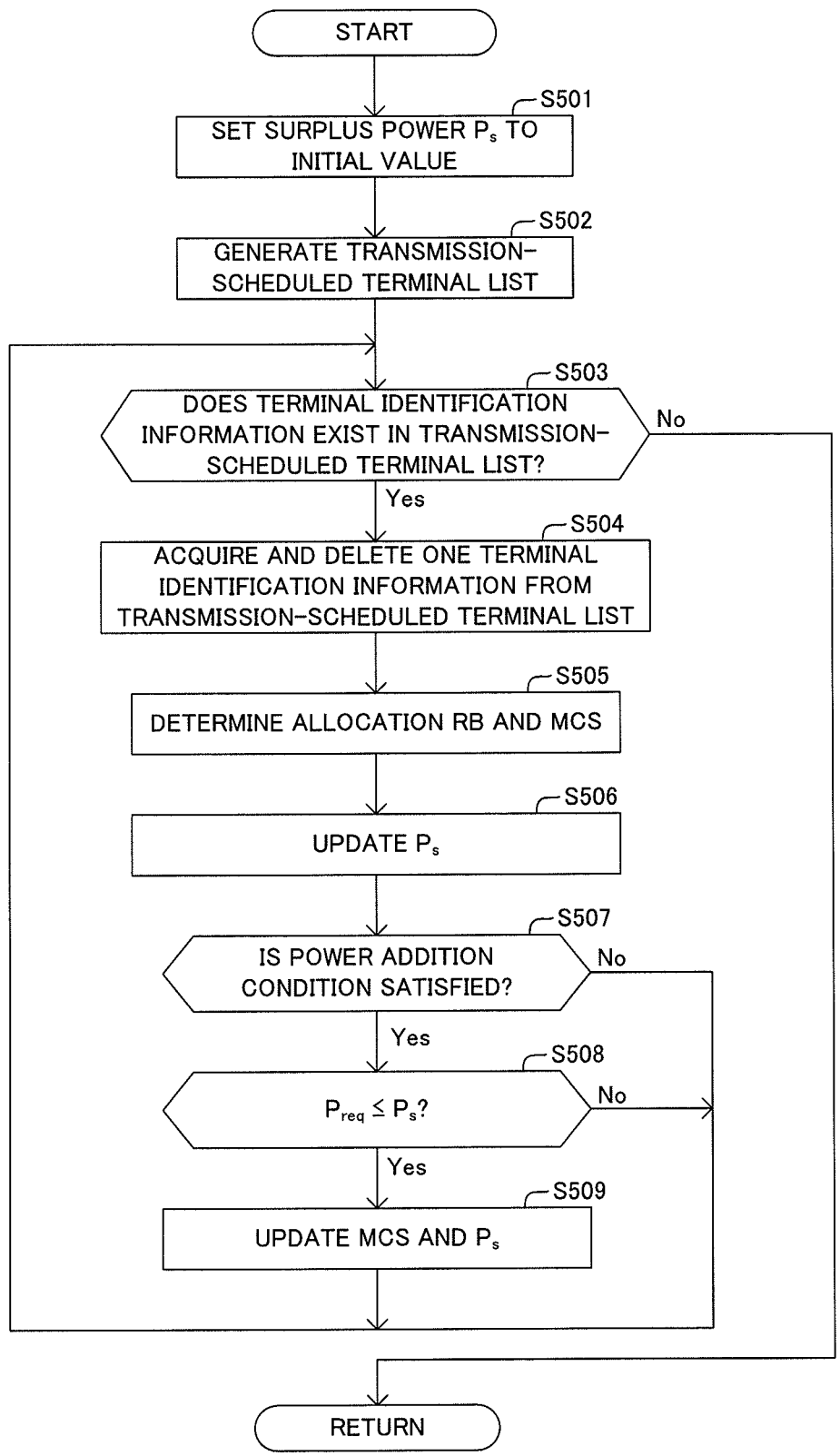

US 8,755,346 B2

BASE STATION, RADIO RESOURCE ALLOCATION METHOD, AND RECORDING MEDIUM

INCORPORATION BY REFERENCE

This application is based upon and claims the benefit of priority from Japanese patent application No. 2011-047395, filed on Mar. 4, 2011, the disclosure of which is incorporated herein in its entirety by reference.

TECHNICAL FIELD

The present application relates to a base station performing radio communication with a communication terminal.

BACKGROUND ART

A radio communication system compliant with LTE (Long Term Evolution) in 3GPP (Third Generation Partnership Project) is known. This radio communication system is configured by arranging a plurality of base stations so that each of the base stations communicates with a communication terminal (a mobile station) located within a communication area (referred to as a cell hereinafter) allocated to the base station.

The radio communication system uses the same communication band in each of a plurality of cells. Therefore, a difference between the level of a signal transmitted and received by a communication terminal (referred to as an edge terminal hereinafter) located on the border between cells to and from the base station of an own cell (a cell to which the edge terminal belongs) and the level of a signal (i.e., an interference signal) transmitted and received in an adjacent cell (a cell adjacent to the own cell) is small. Thus, there is a fear that the quality of a communication path (the communication path quality) between the edge terminal and the base station of the own cell becomes extremely low (deteriorates).

In order to address such a problem, there is a known technique called FFR (Fractional Frequency Reuse) aiming at suppression of signal interference between cells. The FFR is a technique of limiting allocation of a radio resource (a communication band and transmission power) in the adjacent cell in order to secure the quality of a communication path between the edge terminal and the base station of the own cell.

Herein, the outline of an operation of a radio communication system in which the FFR is applied to a downlink (a communication link for transmitting data from a base station to a communication terminal) will be described. In this example, as shown in FIG. 1, the radio communication system is equipped with three base stations 1 to 3 and nine communication terminals 11 to 13, 21 to 23, and 31 to 33.

To each of the base stations 1 to 3, one cell is allocated. To be specific, a cell C1 is allocated to the base station 1, a cell C2 is allocated to the base station 2, and a cell C3 is allocated to the base station 3. Each of the base stations may be configured so that a plurality of cells can be allocated thereto.

Further, the communication terminals 11 to 13 belong to the cell C1 (i.e., a communication link for performing communication with the base station 1 is established). The communication terminals 21 to 23 belong to the cell C2. The communication terminals 31 to 33 belong to the cell C3. Herein, a case that the communication terminals 12, 13, 21, 23, 31 and 32 are edge terminals and the other communication terminals 11, 22 and 33 are center terminals will be assumed.

For the respective cells, the radio communication system sets priority bands that vary with the cell. In this example, as shown in FIG. 2, the radio communication system divides a communication band (a system band) F0 available in the radio communication system into three partial bands F1 to F3, sets the partial band F1 as a priority band of the cell C1, sets the partial band F2 as a priority band of the cell C2 and sets the partial band F3 as a priority band of the cell C3.

Next, each of the communication terminals notifies communication path quality information representing the communication path quality to the base station. Based on the notified communication path quality information, the base station determines whether the communication terminal having notified the communication path quality information is a terminal (referred to as the edge terminal hereinafter) on which an influence of signal interference from the adjacent cell is comparatively large or a terminal (referred to as the center terminal hereinafter) on which an influence of signal interference from the adjacent cell is comparatively small.

After that, the base station allocates a communication band to be used for performing communication with the edge terminal from the set priority band. Therefore, describing with the base station 1 as an example, as shown in FIG. 3, an edge terminal allocatable band FE that is a communication band allocatable as a communication band to be used for radio communication between the base station 1 and the edge terminal is set to the priority band F1 of the cell C1.

Moreover, as shown in FIG. 4, the base station uses preset reference transmission power P0 as transmission power to be used for performing communication with the edge terminal. For example, the reference transmission power P0 is an average value over the whole system band F0 of the maximum values of power that the base station can simultaneously output for transmission of radio signals.

Further, the base station allocates a communication band to be used for performing communication with the center terminal from the whole communication band available in the cell (i.e., the system band). Therefore, describing with the base station 1 as an example, as shown in FIG. 3, a center terminal allocatable band FC that is a communication band allocatable as a communication band to be used for performing radio communication between the base station 1 and the center terminal is set to the system band F0.

Furthermore, as shown in FIG. 4, the base station uses limitation transmission power P1 that is smaller than the reference transmission power P0 by a preset transmission power difference ΔP, as the transmission power to be used for performing communication with the center terminal.

According to this, since the interference of radio signals transmitted and received within another cell in radio signals using the priority band is suppressed, it is possible to improve the communication path quality between the edge terminal and the base station (Non-Patent Document 1).

The base station determines a communication band to be allocated to each of the communication terminals based on the allocated transmission power. In the LTE, a unit of allocation of a communication band is called a resource block (RB). The base station determines an actually allocated RB (an allocation RB) from the allocatable communication band for each of the communication terminals.

Further, the base station determines a modulation and coding scheme (MCS) representing a combination of a modulation scheme and a code rate, based on the number of the determined allocation RBs and channel quality information (CQI) reported from the communication terminals.

CQI is information obtained by quantizing the communication path quality of a channel such as a data channel, and is defined by a table in the LTE specification (Non-Patent Document 2). In the CQI table, a relation between a communication band and a modulation scheme, a code rate and spectrum efficiency for achieving a target error rate is specified. Index (information for identifying data within the table) in this table is set in the ascending order from data of low spectrum efficiency.

Because a combination of a modulation scheme and a code rate is previously set in the CQI table, it is possible to previously calculate a communication path quality (SINR: a signal to noise interference ratio) necessary for achieving the target error rate. The communication terminal measures the communication path quality and reports, to the base station, the Index of CQI with the highest spectrum efficiency in a range that the target error rate can be achieved.

Further, the base station stores a table in which the number of the allocation RBs and a data size (TBS: a transport block size) that can achieve the target error rate is related. Like CQI, this table is defined by the LTE specification (Non-Patent Document 2). Moreover, when the TBS is determined, the modulation scheme is also determined from another table (Non-Patent Document 2). Therefore, it is possible to previously calculate a required communication path quality for each TBS.

In the case of transmitting data to the communication terminals by using a plurality of RBs, the base station uses the same modulation scheme for all of the RBs. Therefore, the base station calculates an average communication path quality from the Index of the CQI reported from the communication terminals, and determines the TBS based on the calculated communication path quality.

To be specific, the base station selects the largest TBS from TBSs that can achieve a required error rate based on the calculated communication path quality. The base station selects a TBS smaller than a TBS necessary for transmitting unsent data. Moreover, the Index in the TBS table is notified to the communication terminal as an MCS Index.

[Non-Patent Document 1] Bin Fan, et al., "A Dynamic Resource Allocation Scheme Based on Soft Frequency Reuse for OFDMA Systems," IEEE 2007 International Symposium on Microwave, Antenna, Propagation and EMC Technologies for Wireless Communications, IEEE, August 2007, pp. 121-125

[Non-Patent Document 2] 3GPP TS 36.213 V8.8.0, September 2009, pp. 25-33, 47-48

As transmission power used for transmitting a radio signal to a certain communication terminal decreases, spectrum efficiency (each-terminal spectrum efficiency), which is the amount of information that can be transmitted to the communication terminal per unit time and per unit communication band, also decreases.

Therefore, the spectrum efficiency of the whole base station (all-terminal spectrum efficiency) becomes lower when the limitation transmission power P1 is allocated as the transmission power for a center terminal than when the reference transmission power P0 is allocated as the transmission power for a center terminal. Herein, the all-terminal spectrum efficiency is an average value of the each-terminal spectrum efficiency over all of the communication terminals belonging to the own cell.

For example, the following case will be assumed: in the example shown in FIGS. 1 to 4, the base station 1 allocates the priority band F1 as a communication band and allocates the reference transmission power P0 as transmission power to an edge terminal and allocates the partial bands F2 and F3 and allocates the limitation transmission power P1 as transmission power to a center terminal.

In this case, as shown in FIG. 5, the transmission power allocated by the base station 1 is the reference transmission power P0 in the partial band F1, and is the limitation transmission power P1 in the partial bands F2 and F3. Therefore, in the partial bands F2 and F3, surplus power PA corresponding to the transmission power difference ΔP occurs. That is to say, in this example, there is a problem that the all-terminal spectrum efficiency wastefully lowers for the surplus power in the base station 1.

Accordingly, an object of the present application is to provide a base station capable of solving the aforementioned problems.

SUMMARY

In order to achieve the object, a base station of an illustrative embodiment of the present invention is a base station performing radio communication with each a communication terminal.

Further, this base station includes:

a communication path quality information acquisition unit configured to, for the communication terminal, acquire communication path quality information representing a communication path quality, which is a quality of a communication path between the communication terminal and the base station; and a radio resource allocation unit configured to:

allocate power larger than previously set reference transmission power as transmission power for transmitting a radio signal to an edge terminal configuring a first partial edge terminal group, which is at least part of an edge terminal group configured by an edge terminal that is a communication terminal whose communication path quality represented by the acquired communication path quality information is lower than a previously set threshold quality;

allocate the reference transmission power as the transmission power to an edge terminal configuring a second partial edge terminal group, which is a remaining part of the edge terminal group.

Further, a radio resource allocation method of an illustrative embodiment of the present invention is a method applied to a base station performing radio communication with a communication terminal, and the radio resource allocation method includes:

for the communication terminal, acquiring communication path quality information representing a communication path quality, which is a quality of a communication path between the communication terminal and the base station; and allocating power larger than previously set reference transmission power as transmission power for transmitting a radio signal to an edge terminal configuring a first partial edge terminal group, which is at least part of an edge terminal group configured by an edge terminal that is a communication terminal whose communication path quality represented by the acquired communication path quality information is lower than a previously set threshold quality, allocating the reference transmission power as the transmission power to an edge terminal configuring a second partial edge terminal group, which is a remaining part of the edge terminal group.

Further, a recording medium of another illustrative embodiment of the present invention is a computer-readable recording medium storing a radio resource allocation program which, when executed by a processor performs a method comprising:

for a communication terminal, acquiring communication path quality information representing a communication path quality, which is a quality of a communication path between the communication terminal and the base station; and allocating power larger than previously set reference transmission power as transmission power for transmitting a radio signal to an edge terminal configuring a first partial edge terminal group, which is at least part of an edge terminal group configured by an edge terminal that is a communication terminal whose communication path quality represented by the acquired communication path quality information is lower than a previously set threshold quality, allocating the reference transmission power as the transmission power to an edge terminal configuring a second partial edge terminal group, which is a remaining part of the edge terminal group.

Further, a base station of another illustrative embodiment of the present invention is a base station performing radio communication with each communication terminal of a plurality of communication terminals.

Further, this base station includes:

a communication path quality information acquisition means for, for each of the plurality of communication terminals, acquiring communication path quality information representing a communication path quality, which is a quality of a communication path between the communication terminal and the base station; and a radio resource allocation means for:

allocating power larger than previously set reference transmission power as transmission power for transmitting a radio signal to each edge terminal configuring a first partial edge terminal group, which is at least part of an edge terminal group configured by an edge terminal that is a communication terminal whose communication path quality represented by the acquired communication path quality information is lower than a previously set threshold quality;

allocating the reference transmission power as the transmission power to each edge terminal configuring a second partial edge terminal group, which is a remaining part of the edge ten final group; and allocating limitation transmission power smaller than the reference transmission power as the transmission power to each center terminal that is a communication terminal whose communication path quality represented by the acquired communication path quality information is higher than the threshold quality.

With the configurations as described above, the present application can prevent the spectrum efficiency of a whole base station from wastefully becoming low while increasing the communication path quality.

BRIEF DESCRIPTION OF DRAWINGS

FIG. 6 is a diagram representing a schematic configuration of a radio communication system relating to a first illustrative embodiment of the present invention;

FIG. 7 is a block diagram representing a schematic function of the radio communication system relating to the first illustrative embodiment of the present invention;

FIG. 8 is a flowchart showing the operation performed by a base station relating to the first illustrative embodiment of the present invention to determine whether a communication terminal is an edge terminal or a center terminal;

FIG. 9 is a flowchart showing the operation performed by the base station relating to the first illustrative embodiment of the present invention to set an allocatable radio resource range;

FIG. 10 is a flowchart showing the operation performed by the base station relating to the first illustrative embodiment of the present invention to determine an allocation resource block and a modulation and coding scheme;

FIG. 11 is a flowchart showing the operation performed by the base station relating to the first illustrative embodiment of the present invention to add transmission power to allocate;

FIG. 12 is a block diagram representing a schematic function of a radio communication system relating to a second illustrative embodiment of the present invention;

FIG. 13 is a flowchart showing the operation performed by a base station relating to the second illustrative embodiment of the present invention to determine an allocation resource block and a modulation and coding scheme;

ILLUSTRATIVE EMBODIMENT

Figure 1:
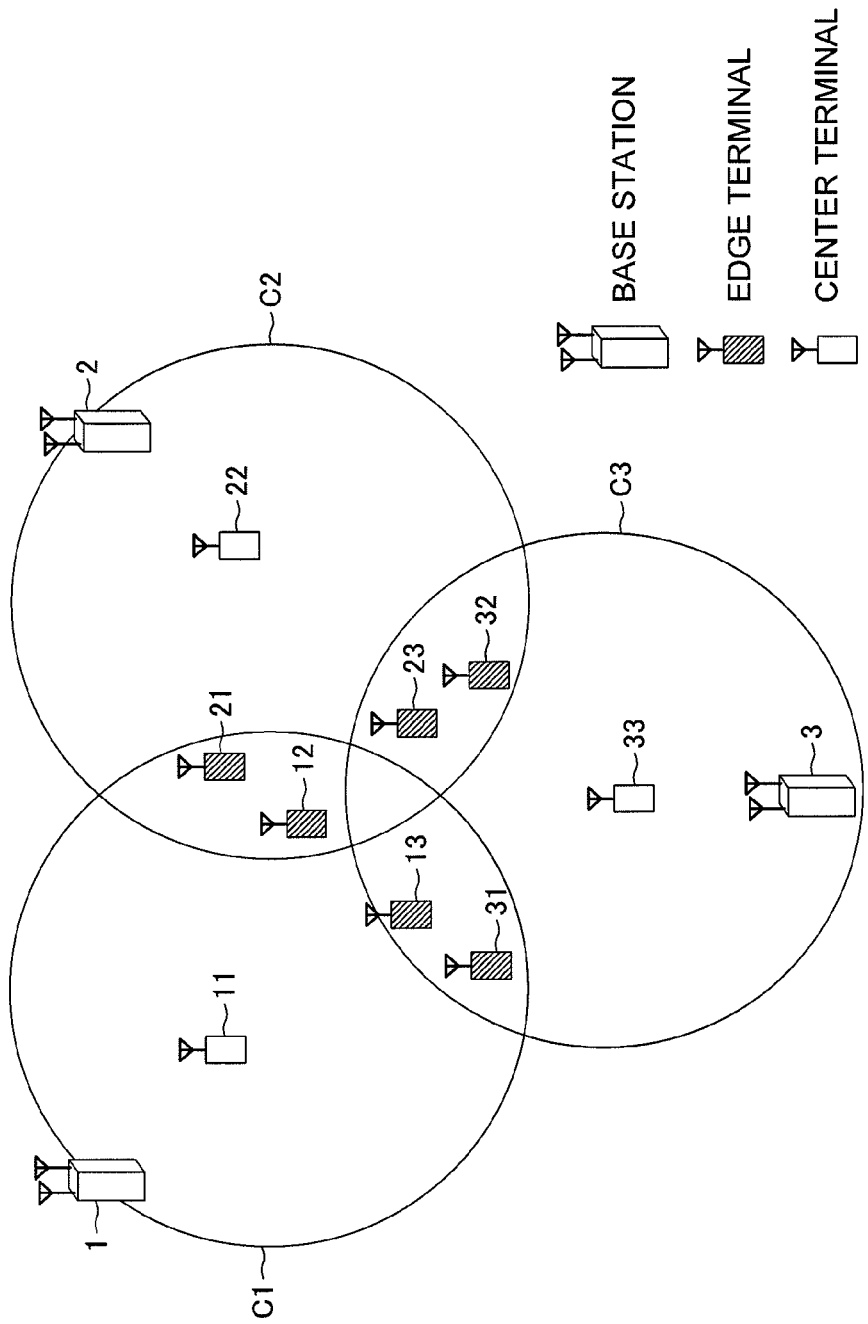
FIG. 1 an explanation diagram conceptually showing an operation of a radio communication system relating to a background art.
Figure 2:
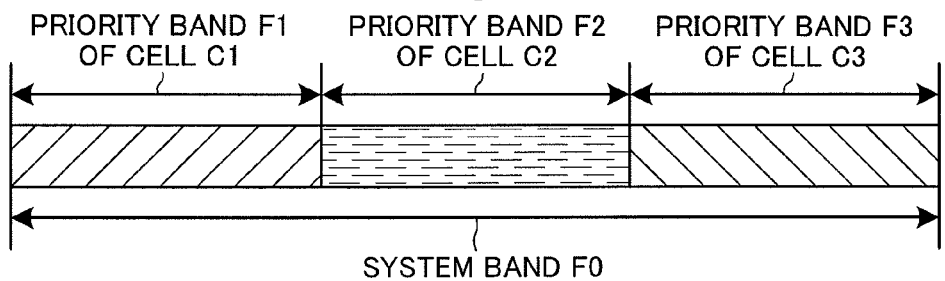
FIG. 2 is an explanation view conceptually showing a priority band used in the radio communication system relating to the background art.
Figure 3:
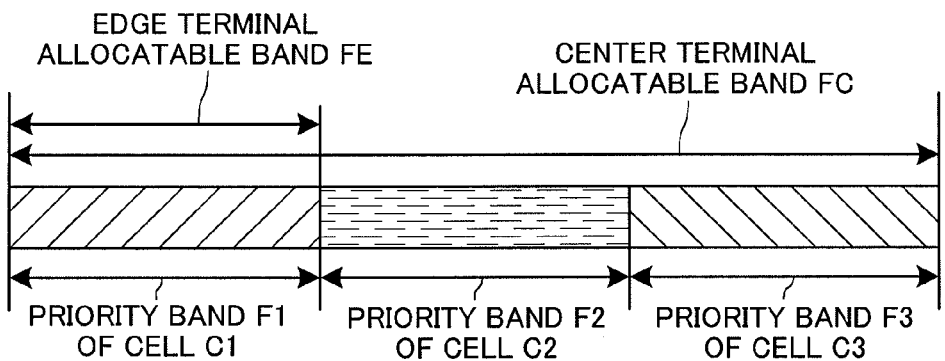
FIG. 3 is an explanation view conceptually showing communication bands allocated to an edge terminal and a center terminal in the radio communication system relating to the background art.
Figure 4:
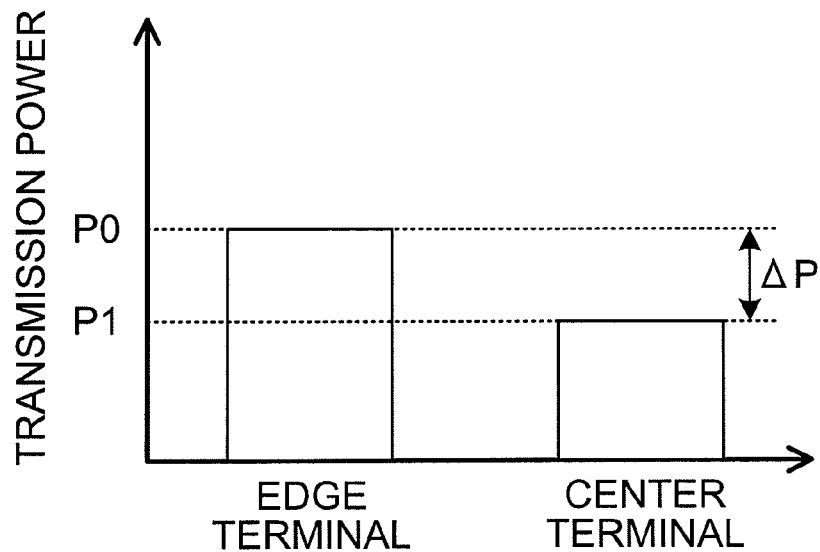
FIG. 4 is an explanation view conceptually showing transmission power allocated to the edge terminal and the center terminal in the radio communication system relating to the background art.
Figure 5:
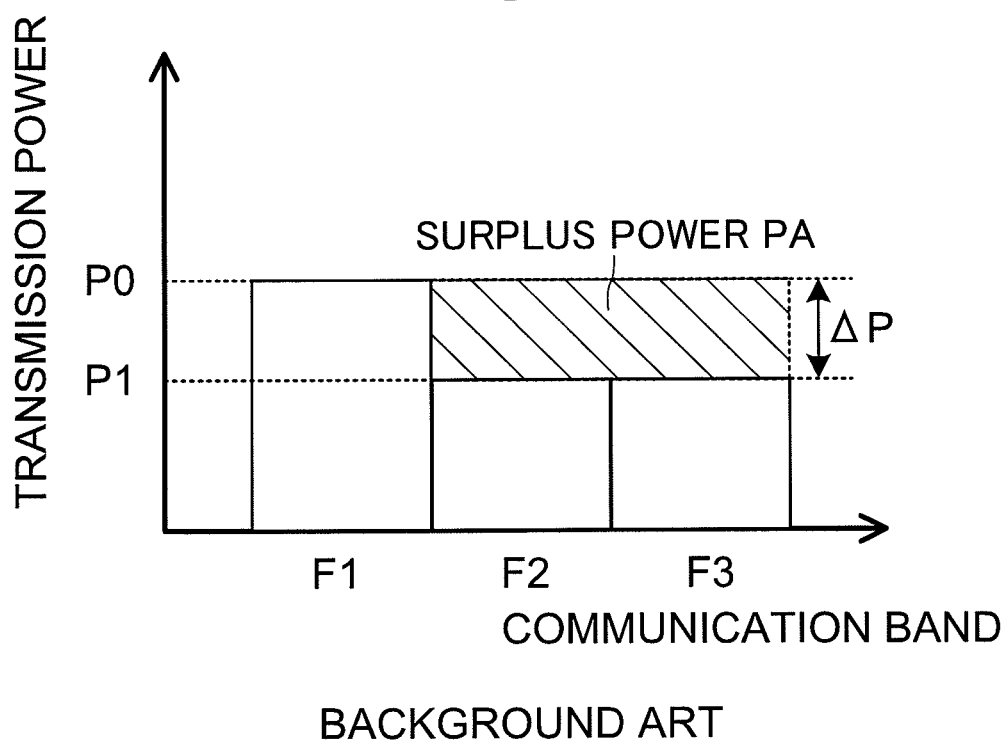
FIG. 5 is an explanation view conceptually showing surplus power occurring in the radio communication system relating to the background art.

Below, respective illustrative embodiments of a base station, a radio resource allocation method and a recording medium according to the present invention will be described with reference to FIGS. 6 to 15.

First Illustrative Embodiment

Configuration

As shown in FIG. 6, a radio communication system 1000 relating to a first illustrative embodiment includes a plurality of base stations 100 . . . and a plurality of communication terminals 200 . . . . The radio communication system 1000 is a system that the present application is applied to a downlink (a communication link for transmitting data from the base station 100 to the communication terminal 200) of LTE (Long Term Evolution).

The plurality of base stations 100 . . . are connected so as to be capable of communicating with each other via a communication line NW. Moreover, to each of the base stations 100, one communication area (cell) is allocated. The respective base stations 100 may be configured so that a plurality of cells can be allocated thereto.

Each of the base stations 100 performs radio communication with the communication terminals 200 located within the cell allocated to the base station (own base station) 100. Each of the base stations 100 is configured so as to be capable of executing simultaneous radio communication with the respective communication terminals 200 . . . .

Each of the base stations 100 is equipped with an information processing device that is not shown in the drawings. The information processing device is equipped with a central processing unit (CPU) and a storage device (a memory and a hard disk drive (HDD)). Each of the base stations 100 is configured so as to realize a function described later by the CPU's execution of a program stored in the storage device.

Each of the communication terminals 200 is a mobile phone terminal. Each of the communication terminals 200 may be a personal computer, a PHS (Personal Handyphone System), a PDA (Personal Data Assistance, Personal Digital Assistant), a smartphone, a car navigation terminal, a game terminal, or the like.

Each of the communication terminals 200 is equipped with a CPU, a storage device (a memory), an input device (a key button and a microphone), and an output device (a display and a speaker). Each of the communication terminals 200 is configured so as to realize a function described later by the CPU's execution of a program stored in the storage device.

(Function)

FIG. 7 is a block diagram representing a function of the radio communication system 1000 configured as described above.

The function of the base station 100 includes a base station operation unit (a communication path quality information acquisition unit) 101, a reference signal generation unit 102, an adjacent cell information notification unit 103, an edge terminal determination unit 104, a transmission data management unit 105, an allocation resource setting unit 106, an allocation resource determination unit 107, and an additional power allocation unit 108. The allocation resource setting unit 106, the allocation resource determination unit 107 and the additional power allocation unit 108 configure a radio resource allocation unit.

The base station operation unit 101 has a function of transmitting and receiving radio signals between the base station 100 and the connecting communication terminal 200 (i.e., a communication link is established). Moreover, the base station operation unit 101 has a function of performing communication with the other base station 100 connected via the communication line NW. Because the base station operation unit 101 is a function known in a general radio communication system, a detailed description thereof will be omitted.

The reference signal generation unit 102 has a function of generating a predetermined signal (a reference signal) that the communication terminal 200 uses for measuring the communication path quality. The communication path quality is the quality of a communication path between the communication terminal 200 and the base station 100. The base station operation unit 101 has a function of transmitting the reference signal generated by the reference signal generation unit 102 to the communication terminal 200.

The adjacent cell information notification unit 103 has a function of transmitting (notifying) adjacent cell information to the communication terminal 200 via the base station operation unit 101. The adjacent cell information includes cell identification information (e.g., a cell number) for identifying an adjacent cell, which is a cell adjacent to an own cell that is a cell allocated to the base station 100.

The edge terminal determination unit 104 has a function of determining whether the communication terminal 200 is an edge terminal or a center terminal based on communication path quality information (described later) reported by the communication terminal 200 (i.e., received from the communication terminal 200) and generating determination result information representing a determination result. The base station operation unit 101 has a function of transmitting the determination result information generated by the edge terminal determination unit 104 to the allocation resource setting unit 106 and the allocation resource determination unit 107, respectively.

The transmission data management unit 105 has a function of temporarily storing (holding) data received (arrived) via the communication line NW until transmission to the communication terminal is completed. Moreover, the transmission data management unit 105 has a function of managing (storing) data attribute information representing the attribute of the received data. The data attribute information includes information representing a data size, information for identifying a communication terminal that is a transmission destination of data, and the like.

The allocation resource setting unit 106 has a function of setting an allocatable radio resource range for each of the plurality of communication terminals 200 . . . . The allocatable radio resource range is a range of a radio resource that the base station 100 can allocate to the communication terminal 200.

In this illustrative embodiment, a radio resource includes transmission power and a communication band. Transmission power is power consumed for transmitting a radio signal by using only one resource block, which will be described later. The allocation resource setting unit 106 has a function of transmitting (reporting) information representing the set allocatable radio resource range to the allocation resource determination unit 107.

The allocation resource determination unit 107 has a function of, for each of the plurality of communication terminals 200 . . . , determining a communication band to be allocated to the communication terminal and a modulation and coding scheme, based on the allocatable radio resource range set by the allocation resource setting unit 106 and the data size of data that has not been transmitted to the communication terminal 200 stored by the transmission data management unit 106.

In this illustrative embodiment, a unit of allocation of a communication band is also referred to as a resource block (RB). A modulation and coding scheme (MCS) represents a combination of a modulation scheme and a code rate. The allocation resource determination unit 107 transmits (reports) the RB (allocation RB) and the modulation and coding scheme having been determined to the additional power allocation unit 108.

In this illustrative embodiment, the allocation resource determination unit 107 sets (determines) a scheme that spectrum efficiency is larger as the transmission power allocated to the communication terminal 200 is larger as the modulation and coding scheme, for the communication terminal 200. Spectrum efficiency is the amount of information that can be transmitted per unit time and per unit communication band.

For an edge terminal satisfying a power addition condition set in advance, the additional power allocation unit 108 reallocates power larger than the reference transmission power as the transmission power, and changes the modulation and coding scheme to a scheme that spectrum efficiency is higher. In addition, in accordance with the change of the modulation and coding scheme, the additional power allocation unit 108 changes the data size for transmitting unsent data held in the transmission data management unit 105.

The function of the communication terminal 200 includes a terminal operation unit 201 and a reception quality measurement unit 202.

The terminal operation unit 201 has a function of transmitting and receiving radio signals between the communication terminal 200 and the connecting base station 100 (i.e., a communication link is established). Because the terminal operation unit 201 is a known function in a general radio communication system, a detailed description thereof will be omitted.

The reception quality measurement unit 202 has a function of measuring a reception quality based on a reference signal in an adjacent cell identified by the adjacent cell information notified (received) from the base station 100 and a reference signal in an own cell (a cell to which the communication terminal 200 belongs).

The reception quality is the quality of a radio signal received from the base station 100 allocated to the own cell. Moreover, the reception quality measurement unit 202 has a function of transmitting (reporting) the reception quality information representing the measured reception quality to the base station 100 via the terminal operation unit 201.

In this illustrative embodiment, the reception quality measurement unit 202 uses information representing CQI (Channel Quality Information), RSRQ (Reference Signal Received Quality) of the reference signal in the own cell and RSRQ of the reference signal in the adjacent cell, as the reception quality information.

The base station operation unit 101 of the base station 100 has a function of receiving the reception quality information from the communication terminal 200 and acquiring the communication path quality information based on the received reception quality information. The communication path quality information is information representing a communication path quality. In this illustrative embodiment, the communication path quality information is information based on a value acquired based on a radio signal that the communication terminal 200 has received from the base station 100 (own station) allocated to the own cell and a value acquired based on a radio signal that the communication terminal 200 has received from the base station 100 (adjacent station) allocated to the adjacent cell.

(Operation)

Next, an operation of the radio communication system 1000 described above will be explained.

The base station 100 is configured to perform a function shown by a flowchart in FIG. 8 on each of the communication terminals 200 . . . belonging to an own cell with every preset execution period. By performing this function, the base station 100 determines whether the communication terminal 200 is an edge terminal or a center terminal.

The base station 100 calculates a minimum value (a minimum reception quality difference) $\Delta RSRQ_{min}$ [dB] of a difference in reception quality between the own cell and an adjacent cell based on reception quality information received from a certain communication terminal 200 and Formula 1. In this embodiment, the minimum reception quality difference $\Delta RSRQ_{min}$ [dB] configures the communication path quality.

$$\Delta RSRQ_{min} = RSRQ_{serv} - MAX\{RSRQ(n)\} \quad \text{[Formula 1]}$$

Herein, $RSRQ_{serv}$ [dB] is the reception quality in the own cell. Moreover, $RSRQ(n)$ [dB] is the reception quality in an adjacent cell whose cell identification information is n. Moreover, $MAX\{X(n)\}$ is a function that returns the maximum value of $X(n)$. That is to say, $MAX\{RSRQ(n)\}$ represents the reception quality in an adjacent cell that most strongly interferes with communication between the communication terminal 200 and the base station 100 of the own cell.

Therefore, it can be said that, in this illustrative embodiment, the communication path quality information is information based on a value (in this illustrative embodiment, $RSRQ_{serv}$) acquired based on a radio signal that each of the communication terminals 200 . . . has received from the base station 100 and a value (in this illustrative embodiment, $RSRQ(n)$) acquired based on a radio signal that the communication terminal 200 . . . has received from the base station 100 allocated to an adjacent cell.

Upon start of the flowchart shown in FIG. 8, the base station 100 calculates the minimum reception quality difference $\Delta RSRQ_{min}$ [dB] as described above. Next, the base station 100 determines whether the calculated minimum reception quality difference (i.e., the communication path quality) $\Delta RSRQ_{min}$ [dB] is smaller (lower) than a preset threshold (i.e., the threshold quality) $\Delta TH$ [dB] (operation S101).

In a case that the minimum reception quality difference $\Delta RSRQ_{min}$ [dB] is smaller than the abovementioned threshold $\Delta TH$ [dB], the base station 100 determines "Yes," and proceeds to operation S102 to determine that the processing target communication terminal 200 is an edge terminal.

On the other hand, in a case that the minimum reception quality difference $\Delta RSRQ_{min}$ [dB] is equal to or more than the threshold $\Delta TH$ [dB], the base station 100 determines "No" at operation S101 described above, and proceeds to operation S103 to determine that the processing target communication terminal 200 is a center terminal.

Then, the base station 100 ends the processing of this flowchart.

Further, the base station 100 is configured to, after completing the function shown in FIG. 8, perform a function shown by a flowchart in FIG. 9 on each of the communication terminals 200 . . . belonging to the own cell. The base station 100 performs the function shown in FIG. 9, thereby setting an allocatable radio resource range to each of the communication terminals 200 . . . .

Upon start of processing of the flowchart shown in FIG. 9, the base station 100 determines whether the processing target communication terminal 200 is an edge terminal (i.e., whether the processing target communication terminal 200 has been determined as an edge terminal at operation S102 of FIG. 8) (operation S201).

In a case that the processing target communication terminal 200 is determined as an edge terminal, the base station 100 determines "Yes" and proceeds to operation S202. Then, for the communication terminal 200, the base station 100 sets an allocatable radio resource range that a communication band is a priority band previously set for the own cell and transmission power is previously set reference transmission power P0. The allocatable radio resource range is the range of a radio resource that the base station 100 can allocate to each of the plurality of communication terminals 200.

That is to say, in this case, the base station 100 allocates the reference transmission power P0 to the communication terminal 200 as transmission power.

Herein, the reference transmission power P0 is an average value, over a system band, of the maximum values of power that the base station 100 can simultaneously output for transmitting radio signals. The system band is a communication band available in the radio communication system 1000.

After that, the base station 100 ends the processing of this flowchart.

On the other hand, in a case that the processing target communication terminal 200 is determined as a center terminal, the base station 100 determines "No" and proceeds to operation S203. Then, for the communication terminal 200, the base station 100 sets an allocatable radio resource range that a communication band is the system band and transmission power is limitation transmission power P1 smaller than the reference transmission power P0 by a previously set transmission power difference $\Delta P$.

That is to say, in this case, the base station 100 allocates the limitation transmission power P1 to the communication terminal 200 as transmission power.

After that, the base station 100 ends the processing of this flowchart.

Thus, the base station 100 allocates the reference transmission power P0 as transmission power to each of the communication terminals (edge terminals) 200 . . . determined as edge terminals, and allocates the limitation transmission power P1 as transmission power to each of the communication terminals (center terminals) 200 . . . determined as center terminals, thereby allocating transmission power to all of the plurality of communication terminals . . . .

Further, the base station 100 is configured to, after completing the function shown in FIG. 9, perform a function shown by a flowchart in FIG. 10. The base station 100 performs the function shown in FIG. 10, thereby determining an allocation RB and a modulation and coding scheme for each of the communication terminals 200 . . . .

Upon start of processing of the flowchart shown in FIG. 10, the base station 100 sets surplus power Ps [mW] to a previously set initial value (operation S301). In this illustrative embodiment, the initial value is the maximum value of power that the base station 100 can simultaneously output for transmitting radio signals to the plurality of communication terminals 200 . . . .

Then, the base station 100 generates a transmission-scheduled terminal list (operation S302). The transmission-scheduled terminal list includes terminal identification information for identifying each of the communication terminals 200 . . . that data scheduled to be transmitted from the base station 100 to the communication terminal 200 exists.

Next, the base station 100 determines whether the terminal identification information exists within the transmission-scheduled terminal list (operation S303). Herein, a case that the terminal identification information exists within the transmission-scheduled terminal list will be assumed.

In this case, the base station 100 determines "Yes," and proceeds to operation S304 to acquire only one of the terminal identification information from the transmission-scheduled terminal list and delete the acquired terminal identification information from the transmission-scheduled terminal list.

Then, based on the surplus power $P_s$ [mW], the allocatable radio resource range set for the communication terminal 200 identified by the acquired terminal identification information, CQI included in the reception quality information received from the communication terminal 200 and the data size of data scheduled to be transmitted to the communication terminal 200 (the data size represented by the data attribute information), the base station 100 determines a resource block (an allocation RB) as a communication band allocated to the communication terminal 200 and a modulation and coding scheme (operation S305).

That is to say, the base station 100 sets a modulation and coding scheme based on the allocated transmission power, for each of the communication terminals 200 . . . . Moreover, the base station 100 allocates a communication band to each of the plurality of communication terminals 200 . . . .

After that, the base station 100 updates the surplus power $P_s$ to a value that a value obtained by multiplying the number of the determined allocation RBs by the transmission power allocated to the communication terminal 200 (at this moment, the reference transmission power P0 or the limitation transmission power P1) is subtracted from the surplus power $P_s$ (operation S306).

That is to say, the surplus power $P_s$ represents a value obtained by subtracting the sum of the transmission power already allocated to the plurality of communication terminals 200 from the maximum value of the power that the base station 100 can simultaneously output for transmitting radio signals to the plurality of communication terminals 200.

Next, the base station 100 returns to operation S303, and repeatedly executes the processes of operations S303 to S306 until all of the terminal identification information is deleted from the transmission-scheduled terminal list. After that, when all of the terminal identification information is deleted from the transmission-scheduled terminal list, the base station 100 determines "No" at operation S303 to end the processing of this flowchart.

Further, the base station 100 is configured to, after completing the function in FIG. 10, perform the function shown by a flowchart in FIG. 11. By performing the function shown in FIG. 11, for each of the communication terminals 200 . . . , the base station 100 reallocates (adds) transmission power (increases transmission power) and determines the modulation and coding scheme so as to increase spectrum efficiency.

Upon start of processing of the flowchart shown in FIG. 11, the base station 100 generates a power-addition candidate terminal list (operation S401). The power-addition candidate terminal list includes terminal identification information for identifying each of the communication terminals 200 . . . meeting (satisfying) a previously set power addition condition, among the communication terminals (the edge terminals) 200 . . . determined as edge terminals.

The power addition condition is a condition that scheme identification information (in this illustrative embodiment, the index number of the MCS) for identifying the modulation and coding scheme determined for the communication terminal 200 is smaller than a previously set threshold $N_{MCSth}$ and the size of data that can be transmitted by using the modulation and coding scheme is smaller than the data size of data scheduled to be transmitted to the communication terminal 200.

The index number of the MCS is an integer for identifying data within a table that specifies a relation of a communication band, a modulation and coding scheme, and spectrum efficiency. The index number of the MCS is set so as to become smaller as the spectrum efficiency becomes lower.

In this illustrative embodiment, data that the index number is smaller than a predetermined scheme threshold is data that the modulation scheme is a phase modulation scheme. Data that the index number is equal to more than the scheme threshold is data that the modulation scheme is a modulation scheme other than the phase modulation scheme (e.g., a phase amplitude modulation scheme). Moreover, the threshold $N_{MCSth}$ is set to a value that is smaller than the scheme threshold by a previously set variation α.

With such a configuration, as described later, the base station 100 uses, as an object to which transmission power can be added, only an edge terminal 200 for which a modulation and coding scheme of smaller spectrum efficiency than a modulation and coding scheme of the maximum spectrum efficiency (i.e., a modulation and coding scheme represented by data with a value of an index number smaller than the scheme threshold by 1) is set from among modulation and coding schemes with the phase modulation scheme as the modulation scheme in a case that the reference transmission power P0 is allocated as transmission power.

Further, with such a configuration, as described later, when changing the modulation and coding scheme set for the edge terminal 200 to a scheme of larger spectrum efficiency, the base station 100 changes to a scheme with the phase modulation scheme as the modulation scheme.

The base station 100 generates a power-addition candidate terminal list so that terminal identification information for identifying the communication terminal 200 that a modulation and coding scheme with a smaller MCS index number is set is located on the beginning side.

Next, the base station 100 determines whether surplus power $P_s$ is larger than 0 and terminal identification information exists within the power-addition candidate terminal list (operation S402). Herein, a case that terminal identification information exists within the power-addition candidate terminal list will be assumed.

In this case, the base station 100 determines "Yes," and proceeds to operation S403 to acquire only one terminal identification information located at the beginning of the power-addition candidate terminal list.

With such a configuration, as described later, it can be said that, in a case that the reference transmission power P0 is allocated as the transmission power, the base station 100 allocates power larger than the reference transmission power P0 preferentially to the edge terminals 200 . . . that a scheme of small spectrum efficiency is set as the modulation and coding scheme.

Next, in the case of resetting the modulation and coding scheme so as to increase the MCS index number by the abovementioned variation a for the communication terminal 200 identified by the acquired terminal identification information, the base station 100 calculates newly required power (additional power) $P_{req}$ [mW].

To be specific, the base station 100 calculates the additional power $P_{req}$ [mW] based on Formula 2. Herein, $P_{curr}$ [mW] denotes transmission power for each resource block (at a moment that transmission power is reallocated, the reference transmission power P0 or the limitation transmission power P1). Moreover, $\delta P$ denotes a power increase rate for each resource block and is calculated by Formula 3. Moreover, $N_{rb}$ denotes the number of allocation RBs.

$$P_{req} = P_{curr} \cdot \delta P \cdot N_{rb} \quad \text{[Formula 2]}$$

$$\delta P = \frac{SINR(N_{MCS} + \alpha) - SINR(N_{MCS})}{SINR(N_{MCS})} \quad \text{[Formula 3]}$$

In Formula 3, $N_{MCS}$ denotes a current MCS index number. Moreover, SINR(X) represents a function that returns a required (e.g., required for securing a predetermined communication quality) SINR (signal to noise interference ratio) corresponding to an MCS index number X.

Then, the base station 100 determines whether the calculated additional power $P_{req}$ [mW] is equal to or less than the surplus power $P_s$ [mW] (operation S404).

In a case that the additional power $P_{req}$ [mW] is larger than the surplus power $P_s$ [mW], the base station 100 determines "No" and proceeds to operation S407 without executing processes of operations S405 and S406.

On the other hand, in a case that the additional power Preq [mW] is equal to or less than the surplus power Ps [mW], the base station 100 determines "Yes" and proceeds to operation S405. Then, the base station 100 resets the modulation and coding scheme for the communication terminal 200 to a modulation and coding scheme identified by an index number of a value ($=N_{MCS}+\alpha$) obtained by adding the abovementioned variation a to the current index number ($=N_{MCS}$) (i.e., updates the modulation and coding scheme (MCS)). That is to say, the base station 100 changes the modulation and coding scheme set for the communication terminal 200 to a scheme of larger spectrum efficiency.

Furthermore, as the transmission power for the communication terminal 200, the base station 100 reallocates power ($=(1+\delta P) \cdot P_{curr}$) of a value obtained by multiplying the current transmission power $P_{curr}$ [mW] for each resource block by a value ($=1+\delta P$) obtained by adding 1 to the power increase rate $\delta P$. That is to say, as the transmission power, the base station 100 reallocates power larger than the reference transmission power P0 required for using the changed modulation and coding scheme to the communication terminal 200.

Thus, the base station 100 adds allocated transmission power, thereby reallocating power larger than the reference transmission power P0 to the communication terminal (the edge terminal) 200 as the transmission power.

In addition, the base station 100 updates the surplus power $P_s$ to a value obtained by subtracting the additional power $P_{req}$ from the surplus power $P_s$ (operation S405). That is to say, the base station 100 uses the surplus power $P_s$ as transmission power to be added.

It can be said that the edge terminal 200 that the transmission power is added at operation S405 is an edge terminal configuring a first partial edge terminal group. Moreover, it can be said that the edge terminal 200 that the transmission power is not added at operation S405 is an edge terminal configuring a second partial edge terminal group.

Next, the base station 100 determines whether the communication terminal 200 satisfies the power addition condition with regard to the updated modulation and coding scheme (operation S406).

In a case that the communication terminal 200 satisfies the power addition condition with regard to the updated modulation and coding scheme, the base station 100 determines "Yes" and returns to operation S402 without executing a process of operation S407.

On the other hand, in a case that the communication terminal 200 does not satisfy the power addition condition with regard to the updated modulation and coding scheme, the base station 100 determines "No" and proceeds to operation S407. Then, the base station 100 deletes the acquired terminal identification information from the power-addition candidate terminal list.

Next, the base station 100 returns to operation S402, and repeatedly executes the processes of operations S402 to S407 until all of the terminal identification information within the power-addition candidate terminal list is deleted or the surplus power $P_s$ becomes 0 or less. After that, at an earlier moment of a moment that all of the terminal identification information within the power-addition candidate terminal list is deleted or a moment that the surplus power $P_s$ becomes 0 or less, the base station 100 determines "No" at operation S402 and ends the processing of this flowchart.

In a case that the MCS index number increases, the base station 100 can increase the data size of data to be transmitted to the communication terminal 200 based on the data size of data scheduled to be transmitted from the base station 100 to the communication terminal 200 and an increment of the MCS index number.

As described above, the base station 100 according to the first illustrative embodiment allocates power larger than the reference transmission power P0 as transmission power to each of the edge terminals configuring the first partial edge terminal group that is at least part of an edge terminal group configured by edge terminals. Moreover, the base station 100 allocates the reference transmission power P0 as transmission power to each of the edge terminals configuring the second partial edge terminal group that is the remaining part of the edge terminal group. In addition, the base station 100 allocates the limitation transmission power P1 smaller than the reference transmission power P0 to each of center terminals.

According to this, the base station 100 allocates the limitation transmission power P1 smaller than the reference transmission power P0 to the center terminal (the communication terminal 200 determined as the center terminal).

Consequently, it is possible to suppress interference in radio signals transmitted and received in an adjacent cell by radio signals transmitted and received between the base station 100 and the center terminal 200. The adjacent cell is a cell adjacent to a communication area (a cell) allocated to the base station 100.

Furthermore, the base station 100 allocates power larger than the reference transmission power P0 as transmission power to at least part of the edge terminals (the communication terminals 200 determined as edge terminals). Consequently, it is possible to increase spectrum efficiency of the whole base station 100 as compared with a case of allocating the reference transmission power P0 as transmission power to all of the edge terminals 200.

Thus, according to the abovementioned configuration, it is possible to prevent wasteful decrease of the spectrum efficiency of the whole base station 100 while increasing the communication path quality.

Further, in the case of changing the modulation and coding scheme set for the edge terminal 200 to a scheme of larger spectrum efficiency, the base station 100 according to the first illustrative embodiment changes to a scheme that the modulation scheme is the phase modulation scheme.

In a case that the modulation scheme is the phase modulation scheme, it is possible to demodulate a radio signal received by the communication terminal 200 without notifying information for demodulating radio signals from the base station 100 to the communication terminal 200. Therefore, according to the abovementioned configuration, it is possible to securely increase the spectrum efficiency of the whole base station 100 while causing the communication terminal 200 to securely demodulate radio signals.

Further, the base station 100 according to the first illustrative embodiment adds allocation transmission power to only an edge terminal for which a modulation and coding scheme of smaller spectrum efficiency than a modulation and decoding scheme of the largest spectrum efficiency among modulation and decoding schemes that the modulation scheme is the phase modulation scheme is set in a case that the reference transmission power P0 is allocated as transmission power.

According to this, it is possible to use the phase modulation scheme as the changed modulation and coding scheme even when the modulation and coding scheme is changed to a scheme of higher spectrum efficiency. Therefore, it is possible to securely increase the spectrum efficiency of the whole base station 100 while causing the communication terminal 200 to securely demodulate radio signals.

The base station 100 according to the first illustrative embodiment is configured to, when changing a modulation and coding scheme set for an edge terminal to a scheme of larger spectrum efficiency, change to a scheme with an index number larger by a previously set variation α. The base station 100 according to a modified example of the first illustrative embodiment may be configured to change to a scheme that the spectrum efficiency is larger than previously set target spectrum efficiency (e.g., a scheme that the index number is a previously set target value).

Second Illustrative Embodiment

Next, a radio communication system according to a second illustrative embodiment of the present invention will be described. The radio communication system according to the second illustrative embodiment is different from the radio communication system according to the first illustrative embodiment in executing a process of allocating a communication band to each of a plurality of communication terminals in turn and, in the process, reallocating lager power than reference transmission power as transmission power to a communication terminal satisfying a predetermined condition. Therefore, a description will be made below focusing on the different point.

(Function)

As shown in FIG. 12, the radio communication system 1000 according to the second illustrative embodiment includes a base station 110 instead of the base station 100.

A function of the base station 110 is a function that the allocation resource determination part 107 and the additional power allocation part 108 of the function of the base station 100 according to the first illustrative embodiment are replaced with an allocation resource determination part 111.

The allocation resource determination part 111 has both the function of the allocation resource determination part 107 and the function of the additional power allocation part 108 of the first illustrative embodiment.

(Operation)

The base station 110 according to the second illustrative embodiment is configured to perform a function shown by a flowchart in FIG. 13 instead of the function shown in FIGS. 10 and 11. The base station 110 perform a function shown in FIG. 13, thereby determining an allocation RB and a modulation and coding scheme for each of the communication terminals 200 . . . .

Upon start of processing of the flowchart shown in FIG. 13, the base station 110 sets the surplus power $P_s$ [mW] to a previously set initial value (operation S501). In this illustrative embodiment, the initial value is the maximum value of power that the base station 110 can simultaneously output for transmitting radio signals to the plurality of communication terminals 200 . . . .

Then, the base station 110 generates a transmission-scheduled terminal list (operation S502). The transmission-scheduled terminal list includes terminal identification information for identifying each of the communication terminals 200 . . . that data scheduled to be transmitted from the base station 110 to the communication terminal 200 exists.

Next, the base station 110 determines whether terminal identification information exists within the transmission-scheduled terminal list (operation S503). Herein, a case that terminal identification information exists within the transmission-scheduled terminal list will be assumed.

In this case, the base station 110 determines "Yes," and proceeds to operation S504 to acquire only one terminal identification information from the transmission-scheduled terminal list and delete the acquired terminal identification information from the transmission-scheduled terminal list.

Then, based on the surplus power $P_s$ [mW], an allocatable radio resource range set for a communication terminal (i.e., a processing target communication terminal) 200 identified by the acquired terminal identification information, CQI included in reception quality information received from the communication terminal 200 and a data size (a data size represented by data attribute information) of data scheduled to be transmitted to the communication terminal 200, the base station 110 determines a resource block (an allocation RB) as a communication band to be allocated to the communication terminal 200 and a modulation and coding scheme (operation S505).

That is to say, the base station 110 sets a modulation and coding scheme based on allocated transmission power for the processing target communication terminal 200. Moreover, the base station 110 allocates a communication band to the processing target communication terminal 200.

After that, the base station 110 updates the surplus power $P_s$ to a value obtained by subtracting, from the surplus power $P_s$, a value that the number of the determined allocation RBs is multiplied by the transmission power allocated to the communication terminal 200 (at this moment, the reference transmission power P0 and the limitation transmission power P1) (operation S506).

That is to say, the surplus power $P_s$ represents a value obtained by subtracting the sum of the transmission power already allocated to the plurality of communication terminals 200 . . . from the maximum value of power that the base station 110 can simultaneously output for transmitting radio signals to the plurality of communication terminals 200 . . . .

Next, the base station 110 determines whether the processing target communication terminal 200 satisfies the abovementioned power addition condition (operation S507).

In a case that the communication terminal 200 does not satisfy the power addition condition, the base station 110 determines "No" and returns to operation S503 without executing processes of operations S508 and S509.

On the other hand, in a case that the communication terminal 200 satisfies the power addition condition, the base station 110 determines "Yes" and proceeds to operation S508. Then, in the case of resetting the modulation and coding scheme so as to increase the index number of the MCS determined at operation S505 by the abovementioned variation α for the communication terminal 200, the base station 110 calculates newly required power (additional power) $P_{req}$ [mW].

Then, the base station 110 determines whether the calculated additional power $P_{req}$ [mW] is equal to or less than the surplus power $P_s$ [mW] (operation S508).

In a case that the additional power $P_{req}$ [mW] is larger than the surplus power $P_s$ [mW], the base station 110 determines "No" and returns to operation S503 without executing a process of operation S509.

On the other hand, in a case that the additional power $P_{req}$ [mW] is equal to or less than the surplus power $P_s$ [mW], the base station 110 determines "Yes" and proceeds to operation S509. Then, the base station 110 resets the modulation and coding scheme for the communication terminal 200 to a modulation and coding scheme identified by the index number of a value ($=N_{MCS}+\alpha$) obtained by adding the variation a to the current index number ($=N_{MCS}$) (i.e., updates the modulation and coding scheme (MCS)). That is to say, the base station 110 changes the modulation and coding scheme set for the communication terminal 200 to a scheme of larger spectrum efficiency.

Furthermore, as the transmission power for the communication terminal 200, the base station 110 reallocates power of a value ($=(1+\delta P) \cdot P_{curr}$) obtained by multiplying the current transmission power $P_{curr}$ [mW] for each resource block by a value ($=1+\delta P$) obtained by adding 1 to the power increase rate δP. That is to say, the base station 110 reallocates power required for using the changed modulation and coding scheme, which is larger than the reference transmission power P0, to the communication terminal 200 as the transmission power.

Thus, the base station 110 adds transmission power allocated to the communication terminal (edge terminal) 200, thereby reallocating larger power than the reference transmission power P0 as transmission power. Moreover, it can be said that the base station 110 thus allocates larger power than the reference transmission power P0 preferentially to the edge terminals 200 . . . that a communication band used for performing radio communication is allocated at the earlier timing.

In addition, the base station 110 updates the surplus power $P_s$ to a value obtained by subtracting the additional power $P_{req}$ from the surplus power $P_s$ (operation S509). That is to say, the base station 110 uses the surplus power $P_s$ as transmission power to be added.

Next, the base station 110 returns to operation S503 and repeatedly executes the processes of operations S503 to S509 until all of the terminal identification information within the transmission-scheduled terminal list is deleted. After that, when all of the terminal identification information within the transmission-scheduled terminal list is deleted, the base station 110 determines "No" at operation S503 and ends the processing of this flowchart.

As described above, the base station 110 according to the second illustrative embodiment of the present invention can produce the same actions and effects as the base station 100 according to the first illustrative embodiment.

Moreover, the base station 110 according to the second illustrative embodiment can more securely increase the number of edge terminals with comparatively high spectrum efficiency.

Third Illustrative Embodiment

Next, a radio communication system of a third illustrative embodiment of the present invention will be described. The radio communication system of the third illustrative embodiment is different from the radio communication system of the first illustrative embodiment in using a reception quality in an own cell as the communication path quality. Therefore, a description will be made below focusing on the different point.

Figure 14:
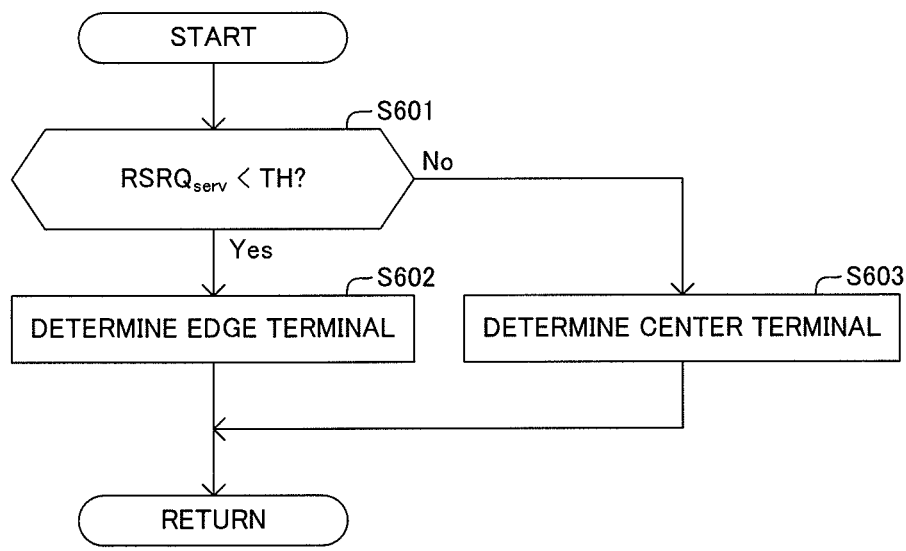
FIG. 14 is a flowchart showing the operation performed by a base station relating to a third illustrative embodiment to determine whether a communication terminal is an edge terminal or a center terminal.

The base station 100 according to the third illustrative embodiment is configured to perform a function shown by a flowchart in FIG. 14 instead of the function of FIG. 8. The base station 100 performs this function, thereby determining whether the communication terminal 200 is an edge terminal or a center terminal.

Upon start of processing of the flowchart shown in FIG. 14, the base station 100 determines whether a reception quality $RSRQ_{serv}$ [dB] in the own cell included in reception quality information received from the processing target communication terminal 200 is smaller (lower) than a previously set threshold (i.e., a threshold quality) TH [dB] (operation S601).

That is to say, in this illustrative embodiment, a reception quality in an own cell configures the communication path quality. Therefore, it can be said that the communication path quality information is information based on a value (in this illustrative embodiment, the reception quality $RSRQ_{serv}$) acquired based on a radio signal that the communication terminal 200 . . . has received from the base station 100.

In a case that the reception quality $RSRQ_{serv}$ [dB] in the own cell is smaller than the abovementioned threshold TH [dB], the base station 100 determines "Yes," and proceeds to operation S602 to determine that the processing target communication terminal 200 is an edge terminal.

On the other hand, in a case that the reception quality $RSRQ_{serv}$ [dB] in the own cell is equal to or more than the abovementioned threshold TH [dB], the base station 100 determines "No" at operation S601, and proceeds to operation S603 to determine that the processing target communication terminal 200 is a center terminal.

Then, the base station 100 ends the processing of this flowchart.

As described above, the base station 100 according to the third illustrative embodiment of the present invention can produce the same actions and effects as the base station 100 according to the first illustrative embodiment.

Fourth Illustrative Embodiment

Figure 15:
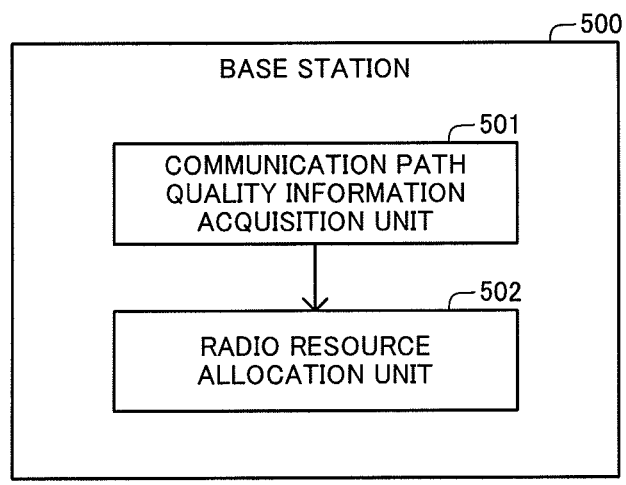
FIG. 15 is a block diagram representing a schematic function of a base station relating to a fourth illustrative embodiment of the present invention.

Next, a base station according to a fourth illustrative embodiment of the present invention will be described with reference to FIG. 15.

A base station 500 according to the fourth illustrative embodiment is a base station performing radio communication with each communication terminal of a plurality of communication terminals.

Moreover, this case station 500 includes:

a communication path quality information acquisition part (a communication path quality information acquisition unit) 501 configured to, for each of the plurality of communication terminals, acquire communication path quality information representing a communication path quality, which is a quality of a communication path between the communication terminal and the base station; and a radio resource allocation part (a radio resource allocation unit) 502 configured to:
   allocate power larger than previously set reference transmission power as transmission power for transmitting a radio signal to each edge terminal configuring a first partial edge terminal group, which is at least part of an edge terminal group configured by an edge terminal that is a communication terminal whose communication path quality represented by the acquired communication path quality information is lower than a previously set threshold quality;
   allocate the reference transmission power as the transmission power to each edge terminal configuring a second partial edge terminal group, which is a remaining part of the edge terminal group; and
   allocate limitation transmission power smaller than the reference transmission power as the transmission power to each center terminal that is a communication terminal whose communication path quality represented by the acquired communication path quality information is higher than the threshold quality.

According to this, the base station 500 allocates limitation transmission power smaller than reference transmission power to a center terminal as transmission power. Consequently, it is possible to suppress interference in radio signals transmitted and received in an adjacent cell by radio signals transmitted and received between the base station 500 and the center terminal. The adjacent cell is a cell adjacent to a communication area (a cell) allocated to the base station 500.

Further, the base station 500 allocates larger power than the reference transmission power to at least part of edge terminals as transmission power. Consequently, it is possible to make spectrum efficiency of the whole base station 500 higher than in the case of allocating the reference transmission power to all of the edge terminals as transmission power. The spectrum efficiency is the amount of information that can be transmitted per unit time and per unit communication band.

Thus, according to the configuration described above, it is possible to prevent wasteful decrease of the spectrum efficiency of the whole base station 500 while increasing a communication path quality.

Although the present application has described above with reference to the illustrative embodiments, the present application is not limited to the illustrative embodiments described above. The configuration and details of the present application can be altered in various manners that can be understood by a person skilled in the art within the scope of the present application.

For example, in the illustrative embodiments described above, the communication path quality information is information based on RSRQ of a reference signal, but may be information based on RSRP (Reference Signal Received Power). Moreover, the communication path quality information may be information based on path loss, geometry, or SINR (Signal to Noise Interference Ratio) of a reference signal.

Further, the present application can also be applied to an uplink (a communication link for transmitting data from a communication terminal to a base station).

The functions of the radio communication systems in the respective illustrative embodiments described above are realized by the CPU's execution of the programs, but may be realized by hardware such as a circuit.

Further, in the respective illustrative embodiments, the program is stored in the storage device, but may be stored in a computer-readable recording medium. For example, the recording medium is a portable medium such as a flexible disk, an optical disk, a magneto-optical disk and a semiconductor memory.

Further, as another modified example of the illustrative embodiments described above, any combination of the abovementioned illustrative embodiments and modified examples may be employed.

<Supplementary Notes>

The whole or part of the illustrative embodiments disclosed above can be described as, but not limited to, the following supplementary notes.

(Supplementary Note 1)

A base station performing radio communication with each communication terminal of a plurality of communication terminals, the base station comprising:

a communication path quality information acquisition unit configured to, for each of the plurality of communication terminals, acquire communication path quality information representing a communication path quality, which is a quality of a communication path between the communication terminal and the base station; and a radio resource allocation unit configured to:
     allocate power larger than previously set reference transmission power as transmission power for transmitting a radio signal to each edge terminal configuring a first partial edge terminal group, which is at least part of an edge terminal group configured by an edge terminal that is a communication terminal whose communication path quality represented by the acquired communication path quality information is lower than a previously set threshold quality;
     allocate the reference transmission power as the transmission power to each edge terminal configuring a second partial edge terminal group, which is a remaining part of the edge terminal group; and
     allocate limitation transmission power smaller than the reference transmission power as the transmission power to each center terminal that is a communication terminal whose communication path quality represented by the acquired communication path quality information is higher than the threshold quality.

According to this, the base station allocates limitation transmission power smaller than reference transmission power to a center terminal as transmission power. Consequently, it is possible to suppress interference in radio signals transmitted and received in an adjacent cell by radio signals transmitted and received between the base station and the center terminal. The adjacent cell is a cell adjacent to a communication area (a cell) allocated to the base station.

Further, the base station allocates larger power than the reference transmission power to at least part of edge terminals as transmission power. Consequently, it is possible to make spectrum efficiency of the whole base station higher than in the case of allocating the reference transmission power to all of the edge terminals as transmission power. The spectrum efficiency is the amount of information that can be transmitted per unit time and per unit communication band.

Thus, according to the configuration described above, it is possible to prevent wasteful decrease of the spectrum efficiency of the whole base station while increasing a communication path quality.

(Supplementary Note 2)

The base station according to Supplementary Note 1, wherein the radio resource allocation unit is configured to, as the transmission power allocated to the communication terminal becomes larger, set a scheme of larger spectrum efficiency, which is an amount of information transmittable per unit time and per unit communication band, as a modulation and coding scheme representing a combination of a modulation scheme and a code rate, for the communication terminal.

(Supplementary Note 3)

The base station according to Supplementary Note 1 or 2, wherein the radio resource allocation unit is configured to: for the edge terminal, allocate the reference transmission power as the transmission power and set a modulation and coding scheme representing a combination of a modulation scheme and a code rate based on the allocated transmission power; and, after that, in a case that the edge terminal configures the first partial edge terminal group, change the modulation and coding scheme set for the edge terminal to a scheme of larger spectrum efficiency, which is an amount of information transmittable per unit time and per unit communication band, and reallocate power required for using the scheme after changed and larger than the reference transmission power to the edge terminal as the transmission power.

(Supplementary Note 4)

The base station according to Supplementary Note 3, wherein the radio resource allocation unit is configured to, when changing the modulation and coding scheme set for the edge terminal to the scheme of larger spectrum efficiency, change to a scheme in which the modulation scheme is a phase modulation scheme.

In a case that the modulation scheme is the phase modulation scheme, it is possible to demodulate a radio signal received by the communication terminal without notifying information for demodulating radio signals from the base station to the communication terminal. Therefore, according to the configuration described above, it is possible to securely increase the spectrum efficiency of the whole base station while causing the communication terminal to securely demodulate radio signals.

(Supplementary Note 5)

The base station according to Supplementary Note 4, wherein the radio resource allocation unit is configured so that the first partial edge terminal group is configured by only the edge terminal that a modulation and coding scheme of smaller spectrum efficiency than a modulation and coding scheme of largest spectrum efficiency among modulation and coding schemes in which the modulation scheme is the phase modulation scheme is set in a case that the reference transmission power is allocated as the transmission power.

According to this, in the case of changing the modulation and coding scheme to a scheme of higher spectrum efficiency, it is possible to use the phase modulation scheme as a modulation and coding scheme after changed. Therefore, it is possible to securely increase the spectrum efficiency of the whole base station while causing the communication terminal to securely demodulate radio signals.

(Supplementary Note 6)

The base station according to any of Supplementary Notes 3 to 5, wherein the radio resource allocation unit is configured to, when changing the modulation and coding scheme set for the edge terminal to the scheme of larger spectrum efficiency, change to a scheme having larger spectrum efficiency than previously set target spectrum efficiency.

(Supplementary Note 7)

The base station according to any of Supplementary Notes 1 to 6, wherein the radio resource allocation unit is configured to: allocate the reference transmission power as the transmission power to the each edge terminal and allocate the limitation transmission power as the transmission power to the each center terminal, thereby allocating the transmission power to all of the plurality of communication terminals and allocating a communication band to each of the plurality of communication terminals; and, after that, add the transmission power to be allocated, thereby reallocating power larger than the reference transmission power to the edge terminal configuring the first partial edge terminal group as the transmission power.

(Supplementary Note 8)

The base station according to any of Supplementary Notes 1 to 6, wherein:

the radio resource allocation unit is configured to execute in turn a process of allocating the reference transmission power as the transmission power to the each edge terminal and allocating the limitation transmission power as the transmission power to the each center terminal, thereby allocating the transmission power to all of the plurality of communication terminals and allocating a communication band to each of the plurality of communication terminals; and the process is configured to, in a case that the communication terminal of a target of the process is the edge terminal and the edge terminal configures the first partial edge terminal group, add the transmission power to be allocated, thereby reallocating power larger than the reference transmission power to the edge terminal as the transmission power.

(Supplementary Note 9)

The base station according to Supplementary Note 7 or 8, wherein the radio resource allocation unit is configured to use, as the transmission power to be added, surplus power of a value obtained by subtracting a sum of the transmission power already allocated to the plurality of communication terminals from a maximum value of power that the base station can simultaneously output for transmitting radio signals to the plurality of communication terminals.

According to this, it is possible to avoid that the sum of the transmission power allocated to the communication terminal becomes too large.

(Supplementary Note 10)

The base station according to any of Supplementary Notes 1 to 9, wherein the communication path quality information is information based on a value acquired based on a radio signal that the communication terminal receives from the base station as an own station and a value acquired based on a radio signal that the communication terminal receives from a base station as an adjacent station allocated to a communication area adjacent to a communication area allocated to the own station.

(Supplementary Note 11)

The base station according to any of Supplementary Notes 1 to 9, wherein the communication path quality information is information based on a value acquired based on a radio signal that the communication terminal receives from the base station.

(Supplementary Note 12)

The base station according to any of Supplementary Notes 1 to 11, wherein the radio resource allocation unit is configured to, in a case that the reference transmission power is allocated as the transmission power, allocate power larger than the reference transmission power preferentially to the edge terminal that a scheme of smaller spectrum efficiency, which is an amount of information transmittable per unit time and per unit communication band, is set as a modulation and coding scheme representing a combination of a modulation scheme and a code rate.

According to this, it is possible to make the spectrum efficiency of communication terminals close to each other.

(Supplementary Note 13)

The base station according to any of Supplementary Notes 1 to 11, wherein the radio resource allocation unit is configured to allocate power larger than the reference transmission power preferentially to the edge terminal that a communication band used for performing radio communication is allocated at earlier timing.

(Supplementary Note 14)

A radio resource allocation method applied to a base station performing radio communication with each communication terminal of a plurality of communication terminals, the radio resource allocation method comprising:

for each of the plurality of communication terminals, acquiring communication path quality information representing a communication path quality, which is a quality of a communication path between the communication terminal and the base station; and allocating power larger than previously set reference transmission power as transmission power for transmitting a radio signal to each edge terminal configuring a first partial edge terminal group, which is at least part of an edge terminal group configured by an edge terminal that is a communication terminal whose communication path quality represented by the acquired communication path quality information is lower than a previously set threshold quality, allocating the reference transmission power as the transmission power to each edge terminal configuring a second partial edge terminal group, which is a remaining part of the edge terminal group, and allocating limitation transmission power smaller than the reference transmission power as the transmission power to each center terminal that is a communication terminal whose communication path quality represented by the acquired communication path quality information is higher than the threshold quality.

(Supplementary Note 15)

The radio resource allocation method according to Supplementary Note 14, comprising, as the transmission power allocated to the communication terminal becomes larger, setting a scheme of larger spectrum efficiency, which is an amount of information transmittable per unit time and per unit communication band, as a modulation and coding scheme representing a combination of a modulation scheme and a code rate, for the communication terminal.

(Supplementary Note 16)

The radio resource allocation method according to Supplementary Note 14 or 15, comprising: for the edge terminal, allocating the reference transmission power as the transmission power and setting a modulation and coding scheme representing a combination of a modulation scheme and a code rate based on the allocated transmission power; and, after that, in a case that the edge terminal configures the first partial edge terminal group, changing the modulation and coding scheme set for the edge terminal to a scheme of larger spectrum efficiency, which is an amount of information transmittable per unit time and per unit communication band, and reallocating power required for using the scheme after changed and larger than the reference transmission power to the edge terminal as the transmission power.

(Supplementary Note 17)

The radio resource allocation method according to Supplementary Note 16, comprising, when changing the modulation and coding scheme set for the edge terminal to the scheme of larger spectrum efficiency, changing to a scheme in which the modulation scheme is a phase modulation scheme.

(Supplementary Note 18)

The radio resource allocation method according to Supplementary Note 17, wherein the first partial edge terminal group is configured by only the edge terminal that a modulation and coding scheme of smaller spectrum efficiency than a modulation and coding scheme of largest spectrum efficiency among modulation and coding schemes in which the modulation scheme is the phase modulation scheme is set in a case that the reference transmission power is allocated as the transmission power.

(Supplementary Note 19)

The radio resource allocation method according to any of Supplementary Notes 16 to 18, comprising, when changing the modulation and coding scheme set for the edge terminal to the scheme of larger spectrum efficiency, changing to a scheme having larger spectrum efficiency than previously set target spectrum efficiency.

(Supplementary Note 20)

The radio resource allocation method according to any of Supplementary Notes 14 to 19, comprising: allocating the reference transmission power as the transmission power to the each edge terminal and allocating the limitation transmission power as the transmission power to the each center terminal, thereby allocating the transmission power to all of the plurality of communication terminals and allocating a communication band to each of the plurality of communication terminals; and, after that, adding the transmission power to be allocated, thereby reallocating power larger than the reference transmission power to the edge terminal configuring the first partial edge terminal group as the transmission power.

(Supplementary Note 21)

The radio resource allocation method according to any of Supplementary Notes 14 to 19, comprising executing in turn a process of allocating the reference transmission power as the transmission power to the each edge terminal and allocating the limitation transmission power as the transmission power to the each center terminal, thereby allocating the transmission power to all of the plurality of communication terminals and allocating a communication band to each of the plurality of communication terminals, wherein the process is configured to, in a case that the communication terminal of a target of the process is the edge terminal and the edge terminal configures the first partial edge terminal group, add the transmission power to be allocated, thereby reallocating power larger than the reference transmission power to the edge terminal as the transmission power.

(Supplementary Note 22)

The radio resource allocation method according to Supplementary Note 20 or 21, comprising using surplus power of a value obtained by subtracting a sum of the transmission power already allocated to the plurality of communication terminals from a maximum value of power that the base station can simultaneously output for transmitting radio signals to the plurality of communication terminals, as the transmission power to be added.

(Supplementary Note 23)

The radio resource allocation method according to any of Supplementary Notes 14 to 22, wherein the communication path quality information is information based on a value acquired based on a radio signal that the communication terminal receives from the base station as an own station and a value acquired based on a radio signal that the communication terminal receives from a base station as an adjacent station allocated to a communication area adjacent to a communication area allocated to the own station.

(Supplementary Note 24)

The radio resource allocation method according to any of Supplementary Notes 14 to 22, wherein the communication path quality information is information based on a value acquired based on a radio signal that the communication terminal receives from the base station.

(Supplementary Note 25)

The radio resource allocation method according to any of Supplementary Note 14 to 24, comprising allocating power larger than the reference transmission power preferentially to the edge terminal that a scheme of smaller spectrum efficiency, which is an amount of information transmittable per unit time and per unit communication band, is set as a modulation and coding scheme representing a combination of a modulation scheme and a code rate, in a case that the reference transmission power is allocated as the transmission power.

(Supplementary Note 26)

The radio resource allocation method according to any of Supplementary Notes 14 to 24, comprising allocating power larger than the reference transmission power preferentially to the edge terminal that a communication band used for performing radio communication is allocated at earlier timing.

(Supplementary Note 27)

A computer-readable recording medium storing a radio resource allocation program comprising instructions for causing a base station performing radio communication with each communication terminal of a plurality of communication terminals to execute a process of:

for each of the plurality of communication terminals, acquiring communication path quality information representing a communication path quality, which is a quality of a communication path between the communication terminal and the base station; and allocating power larger than previously set reference transmission power as transmission power for transmitting a radio signal to each edge terminal configuring a first partial edge terminal group, which is at least part of an edge terminal group configured by an edge terminal that is a communication terminal whose communication path quality represented by the acquired communication path quality information is lower than a previously set threshold quality, allocating the reference transmission power as the transmission power to each edge terminal configuring a second partial edge terminal group, which is a remaining part of the edge terminal group, and allocating limitation transmission power smaller than the reference transmission power as the transmission power to each center terminal that is a communication terminal whose communication path quality represented by the acquired communication path quality information is higher than the threshold quality.

(Supplementary Note 28)

The recording medium according to claim 27, wherein the process is configured to, as the transmission power allocated to the communication terminal becomes larger, set a scheme of larger spectrum efficiency, which is an amount of information transmittable per unit time and per unit communication band, as a modulation and coding scheme representing a combination of a modulation scheme and a code rate, for the communication terminal.

(Supplementary Note 29)

The recording medium according to Supplementary Note 27 or 28, wherein the process is configured to: for the edge terminal, allocate the reference transmission power as the transmission power and set a modulation and coding scheme representing a combination of a modulation scheme and a code rate based on the allocated transmission power; and, after that, in a case that the edge terminal configures the first partial edge terminal group, change the modulation and coding scheme set for the edge terminal to a scheme of larger spectrum efficiency, which is an amount of information transmittable per unit time and per unit communication band, and reallocate power required for using the scheme after changed and larger than the reference transmission power to the edge terminal as the transmission power.

(Supplementary Note 30)

A base station performing radio communication with each communication terminal of a plurality of communication terminals, the base station comprising:

a communication path quality information acquisition means for, for each of the plurality of communication terminals, acquiring communication path quality information representing a communication path quality, which is a quality of a communication path between the communication terminal and the base station; and a radio resource allocation means for:
  allocating power larger than previously set reference transmission power as transmission power for transmitting a radio signal to each edge terminal configuring a first partial edge terminal group, which is at least part of an edge terminal group configured by an edge terminal that is a communication terminal whose communication path quality represented by the acquired communication path quality information is lower than a previously set threshold quality;
  allocating the reference transmission power as the transmission power to each edge terminal configuring a second partial edge terminal group, which is a remaining part of the edge terminal group; and
  allocating limitation transmission power smaller than the reference transmission power as the transmission power to each center terminal that is a communication terminal whose communication path quality represented by the acquired communication path quality information is higher than the threshold quality.

INDUSTRIAL APPLICABILITY

The present application is applicable to, for example, a radio communication system including a base station and a communication terminal performing radio communication with the base station.

What is claimed is:

1. A base station performing radio communication with a communication terminal of a plurality of communication terminals, the base station comprising:

a communication path quality information acquisition unit configured to, for the communication terminal, acquire communication path quality information representing a communication path quality, which is a quality of a communication path between the communication terminal and the base station; and a radio resource allocation unit configured to:
   allocate power larger than previously set reference transmission power as transmission power for transmitting a radio signal to an edge terminal configuring a first partial edge terminal group, which is at least part of an edge terminal group configured by an edge terminal that is a communication terminal whose communication path quality represented by the acquired communication path quality information is lower than a previously set threshold quality;
   allocate the reference transmission power as the transmission power to an edge terminal configuring a second partial edge terminal group, which is a remaining part of the edge terminal group; and
   allocate limitation transmission power smaller than the reference transmission power as the transmission power to each center terminal that is a communication terminal whose communication path quality represented by the acquired communication path quality information is higher than the threshold quality.

2. The base station according to claim 1, wherein the radio resource allocation unit is configured to, as the transmission power allocated to the communication terminal becomes larger, set a scheme of larger spectrum efficiency, which is an amount of information transmittable per unit time and per unit communication band, as a modulation and coding scheme representing a combination of a modulation scheme and a code rate, for the communication terminal.

3. The base station according to claim 1, wherein the radio resource allocation unit is configured to change the modulation and coding scheme set for the edge terminal configuring a first partial edge terminal group to a scheme of larger spectrum efficiency, which is an amount of information transmittable per unit time and per unit communication band, and allocate power required for using the scheme after changed and larger than the reference transmission power to the edge terminal configuring a first partial edge terminal group as the transmission power.

4. The base station according to claim 3, wherein the radio resource allocation unit is configured to, in response to changing the modulation and coding scheme set for the edge terminal configuring a first partial edge terminal group to the scheme of larger spectrum efficiency, change to a scheme in which the modulation scheme is a phase modulation scheme.

5. The base station according to claim 4, wherein the radio resource allocation unit is configured to allocate power larger than the reference transmission power in case that a modulation and coding scheme of smaller spectrum efficiency than a modulation and coding scheme of largest spectrum efficiency among modulation and coding schemes in which the modulation scheme is the phase modulation scheme is set to the edge terminal configuring a first partial edge terminal group.

6. The base station according to claim 3, wherein the radio resource allocation unit is configured to in response to changing the modulation and coding scheme set for the edge terminal to the scheme of larger spectrum efficiency, change to a scheme having larger spectrum efficiency than previously set target spectrum efficiency.

7. The base station according to claim 1, wherein the radio resource allocation unit is configured to add the transmission power to be allocated, thereby reallocating power larger than the reference transmission power to the edge terminal configuring the first partial edge terminal group as the transmission power.

8. The base station according to claim 7, wherein the radio resource allocation unit is configured to use, as the transmission power to be added, surplus power of a value obtained by subtracting a sum of the transmission power already allocated from a maximum value of power that the base station configured to simultaneously output for transmitting radio signals.

9. The base station according to claim 1, wherein the communication path quality information is information based on a value acquired based on a radio signal that the communication terminal receives from the base station as an own station and a value acquired based on a radio signal that the communication terminal receives from a base station as an adjacent station allocated to a communication area adjacent to a communication area allocated to the own station.

10. The base station according to claim 1, wherein the communication path quality information is information based on a value acquired based on a radio signal that the communication terminal receives from the base station.

11. The base station according to claim 1, wherein the radio resource allocation unit is configured to, in a case that the reference transmission power is allocated as the transmission power, allocate power larger than the reference transmission power preferentially to the edge terminal that a scheme of smaller spectrum efficiency, which is an amount of information transmittable per unit time and per unit communication band, is set as a modulation and coding scheme representing a combination of a modulation scheme and a code rate.

12. The base station according to claim 1, wherein the radio resource allocation unit is configured to allocate power larger than the reference transmission power preferentially to the edge terminal that a communication band used for performing radio communication is allocated at earlier timing.

13. A radio resource allocation method applied to abuse station performing radio communication with a communication terminal of a plurality of communication terminals, the radio resource allocation method comprising:
   for the communication terminal, acquiring communication path quality information representing a communication path quality, which is a quality of a communication path between the communication terminal and the base station;
   allocating power larger than previously set reference transmission power as transmission power for transmitting a radio signal to an edge terminal configuring a first partial edge terminal group, which is at least part of an edge terminal group configured by an edge terminal that is a communication terminal whose communication path quality represented by the acquired communication path quality information is lower than a previously set threshold quality;
   allocating the reference transmission power as the transmission power to an edge terminal configuring a second partial edge terminal group, which is a remaining part of the edge terminal group; and
   allocating limitation transmission power smaller than the reference transmission power as the transmission power to each center terminal that is a communication terminal whose communication path quality represented by the acquired communication path quality information is higher than the threshold quality.

14. The radio resource allocation method according to claim 13, further comprising;
   as the transmission power allocated to the communication terminal becomes larger, setting a scheme of larger spectrum efficiency, which is an amount of information transmittable per unit time and per unit communication band, as a modulation and coding scheme representing a combination of a modulation scheme and a code rate, for the communication terminal.

15. The radio resource allocation method according to claim 13, further comprising: changing the modulation and coding scheme set for the edge terminal configuring a first partial edge terminal group to a scheme of larger spectrum efficiency, which is an amount of information transmittable per unit time and per unit communication band; and allocating power required for using the scheme after changed and larger than the reference transmission power to the edge terminal configuring a first partial edge terminal group as the transmission power.

16. The radio resource allocation method according to claim 15, further comprising:

in response to changing the modulation and coding scheme set for the edge terminal to the scheme of larger spectrum efficiency, changing to a scheme in which the modulation scheme is a phase modulation scheme.

17. The radio resource allocation method according to claim 16, further comprising:

allocating power larger than the reference transmission power in case that a modulation and coding scheme of smaller spectrum efficiency than a modulation and coding scheme of largest spectrum efficiency among modulation and coding schemes in which the modulation scheme is the phase modulation scheme is set to the edge terminal configuring a first partial edge terminal group.

18. The radio resource allocation method according to claim 15, comprising:

in response to changing the modulation and coding scheme set for the edge terminal to the scheme of larger spectrum efficiency, changing to a scheme having larger spectrum efficiency than previously set target spectrum efficiency.

19. A computer-readable recording medium storing a radio resource allocation program which, when executed by a processor performs a method comprising:

for a communication terminal, acquiring communication path quality information representing a communication path quality, which is a quality of a communication path between the communication terminal and the base station;

allocating power larger than previously set reference transmission power as transmission power for transmitting a radio signal to an edge terminal configuring a first partial edge terminal group, which is at least part of an edge terminal group configured by an edge terminal that is a communication terminal whose communication path quality represented by the acquired communication path quality information is lower than a previously set threshold quality;

allocating the reference transmission power as the transmission power to an edge terminal configuring a second partial edge terminal group, which is a remaining part of the edge terminal group; and allocating limitation transmission power smaller than the reference transmission power as the transmission power to each center terminal that is a communication terminal whose communication path quality represented by the acquired communication path quality information is higher than the threshold quality.

* * * * *

UNITED STATES PATENT AND TRADEMARK OFFICE
CERTIFICATE OF CORRECTION

| | | |
|---|---|---|
| PATENT NO. | : 8,755,346 B2 | Page 1 of 1 |
| APPLICATION NO. | : 13/412278 | |
| DATED | : June 17, 2014 | |
| INVENTOR(S) | : Daisuke Ohta et al. | |

It is certified that error appears in the above-identified patent and that said Letters Patent is hereby corrected as shown below:

In the Specification

Column 5, Line 37: Delete "ten final" and insert -- terminal --

In the Claims

Column 28, Line 36: Claim 13, delete "abuse" and insert -- a base --

Signed and Sealed this
Second Day of December, 2014

Michelle K. Lee
*Deputy Director of the United States Patent and Trademark Office*